(12) United States Patent
Sparrowhawk et al.

(10) Patent No.: US 8,313,346 B2
(45) Date of Patent: Nov. 20, 2012

(54) COMMUNICATION CABLING WITH SHIELDING SEPARATOR AND DISCONTINUOUS CABLE SHIELD

(75) Inventors: Bryan L. Sparrowhawk, Monroe, WA (US); Patrick S. McNutt, Carnation, WA (US); Franklin C. Marti, Clinton, WA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 336 days.

(21) Appl. No.: 12/645,374

(22) Filed: Dec. 22, 2009

(65) Prior Publication Data

US 2010/0096179 A1     Apr. 22, 2010

Related U.S. Application Data

(63) Continuation-in-part of application No. 11/750,310, filed on May 17, 2007, now Pat. No. 7,637,776.

(60) Provisional application No. 60/800,958, filed on May 17, 2006.

(51) Int. Cl.
*H01R 13/648* (2006.01)
(52) U.S. Cl. .............................. 439/607.05; 174/113 C
(58) Field of Classification Search ............. 439/607.05, 439/607.08, 676; 174/116, 113 C, 99 R, 174/104, 105 R, 103
See application file for complete search history.

(56) References Cited

U.S. PATENT DOCUMENTS

| | | | |
|---|---|---|---|
| 1,959,339 A | 5/1934 | Bennett | |
| 2,796,463 A | 6/1957 | Mallinckrodt | |
| 3,322,889 A * | 5/1967 | Bird et al. | 174/103 |
| 3,573,676 A | 4/1971 | Mayer | |
| 3,896,380 A | 7/1975 | Martin | |
| 4,129,841 A | 12/1978 | Hildebrand et al. | |
| 4,339,733 A | 7/1982 | Smith | |
| 4,743,725 A | 5/1988 | Risman | |
| 4,788,088 A | 11/1988 | Kohl | |

(Continued)

FOREIGN PATENT DOCUMENTS

JP     2006-260897 A     9/2006

OTHER PUBLICATIONS

Brand-Rex, "Augmented Category 6 Cabling Solutions, 10G Plus," Brand-Rex, Pruduct description, 2008, 8 pages.

(Continued)

*Primary Examiner* — Felix O Figueroa
(74) *Attorney, Agent, or Firm* — Davis Wright Tremaine LLP; George C. Rondeau, Jr.; Heather M. Colburn

(57) ABSTRACT

A communications cable having a plurality of twisted wire pairs each having a substantially uniform twist rate along the cable. An elongated shielding separator is positioned between the twisted wire pairs and physically separates them from one another. The shielding separator has a plurality of electrically non-conductive separator sections positioned between the twisted wire pairs and a plurality of electrically conductive separator sections arranged in an alternating pattern with the non-conductive separator sections along the shielding separator. Each of the conductive separator sections has one of a predetermined number of section lengths and is arranged along the shielding separator such that the conductive separator sections are substantially aperiodic with the twist rates of the twisted wire pairs. Optionally, the cable includes a continuous or discontinuous outer cable shielding system enclosing the discontinuous shielding separator and the plurality of twisted wire pairs.

32 Claims, 21 Drawing Sheets

U.S. PATENT DOCUMENTS

| | | | |
|---|---|---|---|
| 5,465,395 | A | 11/1995 | Bartram |
| 5,473,336 | A | 12/1995 | Harman et al. |
| 5,628,647 | A | 5/1997 | Rohrbaugh et al. |
| 5,888,100 | A | 3/1999 | Bofill et al. |
| 5,952,615 | A * | 9/1999 | Prudhon .................. 174/113 C |
| 5,969,295 | A | 10/1999 | Boucino et al. |
| 6,099,345 | A | 8/2000 | Milner et al. |
| 6,207,901 | B1 | 3/2001 | Smith et al. |
| 6,319,069 | B1 | 11/2001 | Gwiazdowski |
| 6,486,405 | B2 | 11/2002 | Lin |
| 6,663,419 | B2 | 12/2003 | Vaden |
| 6,998,537 | B2 | 2/2006 | Clark et al. |
| 7,150,657 | B2 | 12/2006 | Quenneville et al. |
| 7,271,342 | B2 | 9/2007 | Stutzman et al. |
| 7,332,676 | B2 | 2/2008 | Sparrowhawk |
| 7,335,837 | B2 * | 2/2008 | Pfeiler et al. .............. 174/113 C |
| 7,550,676 | B2 | 6/2009 | Stutzman et al. |
| 7,552,520 | B2 | 6/2009 | Wink et al. |
| RE42,266 | E | 4/2011 | Sparrowhawk |
| 2002/0017393 | A1 | 2/2002 | Hanna-Myrick |
| 2006/0048961 | A1 | 3/2006 | Pfeifer et al. |
| 2006/0048964 | A1 | 3/2006 | Rick |
| 2006/0162947 | A1 | 7/2006 | Bolouri-Saransar et al. |
| 2007/0042635 | A1 | 2/2007 | Quenneville et al. |
| 2007/0275583 | A1 | 11/2007 | McNutt et al. |
| 2008/0073106 | A1 | 3/2008 | Brake et al. |
| 2008/0264670 | A1 * | 10/2008 | Glew ........................ 174/113 C |
| 2011/0275239 | A1 | 11/2011 | Seefried et al. |

OTHER PUBLICATIONS

Brand-Rex, "Brand-Rex Copper Cables—10GPLUS," Product description, published before May 6, 2010, 1 page.

Brand-Rex, "Brand-News Brochure" with product descriptions and news, Brand-Rex, Aug. 2006, 6 pages.

English translation of patent abstract of JP 2006-260897, published Sep. 28, 2006, 2 pages.

International Search Report received in PCT/2006/011419, mailed Apr. 10, 2007, 5 pages.

International Search Report received in PCT/US2007/069196, mailed Sep. 16, 2008, 4 pages.

International Search Report received in PCT/US2011/035387, mailed Dec. 23, 2011, 4 pages.

International Search Report, PCT/US2010/061920, mailed Aug. 8, 2011.

Notice of Allowance and Fee(s) Due mailed Dec. 3, 2010, U.S. Appl. No. 12/707,985, filed Feb. 18, 2010, first named inventor Bryan L. Sparrowhawk.

Office Action mailed May 25, 2010, U.S. Appl. No. 12/707,985, filed Feb. 18, 2010, first named inventor Bryan L. Sparrowhawk.

\* cited by examiner

COMMUNICATION CABLING WITH SHIELDING SEPARATOR AND DISCONTINUOUS CABLE SHIELD

CROSS REFERENCE TO RELATED APPLICATION(S)

This application is a continuation-in-part of U.S. patent application Ser. No. 11/750,310, filed on May 17, 2007, now U.S. Pat. No. 7,637,776, the content of which is incorporated herein in its entirety, which claims the benefit of U.S. Provisional Patent Application No. 60/800,958, filed on May 17, 2006, the content of which is incorporated herein in its entirety.

BACKGROUND OF THE INVENTION

1. Field of the Invention

The present invention is directed generally to communication cabling for transmitting signals, and more particularly to reduction of crosstalk between those signals.

2. Description of the Related Art

Communication cabling typically contains multiple wires dedicated to different circuits, communication channels, or devices. For instance, a communication cable can have multiple pairs of wires (such as pairs of copper wires) each pair being used for different communication functions. A conventional communication cable, includes four twisted-wire pairs (also known as "twisted pairs"). Each of the wires in the twisted pairs is substantially identical to one another. As is appreciated by those of ordinary skill in the art, the wires each include an electrical conductor (e.g., a conventional copper wire) surrounded by an outer layer of insulation (e.g., a conventional insulating flexible plastic jacket).

Each of the twisted pairs serves as a differential signaling pair wherein signals are transmitted thereupon and expressed as a specific ratio of balanced voltage differences and balanced current differences between the wires of the twisted pair. A twisted pair can be susceptible to electromagnetic sources including another nearby cable of similar construction. Signals received by the twisted pair from such electromagnetic sources external to the cable's jacket are referred to as "alien crosstalk." The twisted pair can also receive signals from one or more wires of the three other twisted pairs within the cable's jacket, which is referred to as "local crosstalk" or "internal crosstalk."

As signal frequency increases, the individual signals tend to increasingly interfere with one another (i.e., local crosstalk increases) due to the close proximity of the wire pairs. While twisting the two wires of each pair together helps considerably to reduce crosstalk, it is not sufficient by itself as signal frequency increases. Conventional approaches such as using physical spacing within the cable to physically separate and isolate the individual twisted wire pairs from one another can be also help reduce crosstalk. However, the additional physical spacing increases cable diameter and decreases cable flexibility. Other conventional approaches of reducing local crosstalk occurring between these wire pairs include wrapping the wire pairs with metal foil or wire braid, which unfortunately can involve additional assembly, material costs, and cable stiffness.

FIG. 12 depicts an exemplary conventional approach of reducing local crosstalk in a shielded twisted pair cable 10. The prior art shielded twisted pair cable 10 has four twisted wire pairs or twisted pairs 104, 106, 108, and 110 covered by an internal sheath 12. As may best be seen in FIG. 13, the first twisted pair 104 includes wires 104a and 104b, the second twisted pair 106 includes wires 106a and 106b, the third twisted pair 108 includes wires 108a and 108b, and the fourth twisted pair 110 includes wires 110a and 110b. The wires of each of the twisted pairs 104, 106, 108, and 110 are twisted together in accordance with a different twist rate. Thus, each of the twists of the wires 104a and 104b of the twisted pair 104 has a first twist length TL-1, each of the twists of the wires 106a and 106b of the twisted pair 106 has a second twist length TL-2, each of the twists of the wires 108a and 108b of the twisted pair 108 has a third twist length TL-3, and each of the twists of the wires 110a and 110b of the twisted pair 110 has a fourth twist length TL-4.

Returning to FIG. 12, in particular implementations, the twisted pairs 104, 106, 108, and 110 may be twisted together in a bundle (not shown) under the internal sheath 12. The bundle has a twist period that can be, and typically is, longer (i.e., has a lower twist rate) than the twist periods of the twisted pairs 104, 106, 108, and 110. The internal sheath 12 may be covered by insulation 14 (such as Mylar), which is covered by a conductive shield 16. The conductive shield 16 can be used to a certain degree to reduce crosstalk by reducing electrostatic and magnetic coupling between twisted wire pairs contained within the internal sheath 12.

A drain wire 18 is electrically coupled to the conductive shield 16. An external sheath 22 covers the conductive shield 16 and the drain wire 18. The conductive shield 16 is typically connected to a connector shell (not shown), which grounds the conductive shield 16, on each cable end usually through use of the drain wire 18. Connecting the conductive shield 16 to the connector shell can be problematic due to additional complexity of installation, added cable stiffness, special connectors required, and the necessity for an electrical ground available at both ends of the cable 10. Furthermore, improper connection of the conductive shield 16 can reduce or eliminate the effectiveness of the conductive shield and also can raise safety issues due to improper grounding of the drain wire 18. In some improper installations, the conventional continuous shielding of a cable segment is not connected on one or both ends. Unconnected ends of conventional shielding can give rise to undesired resonances related to the unterminated shield length which enhances undesired external interference and crosstalk at those resonant frequencies Thus, unfortunately, crosstalk remains a problem particularly in communications cables carrying signals having higher frequencies. Therefore, a need exists for communication cables configured to reduce alien crosstalk and/or local crosstalk. The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Figure 1:
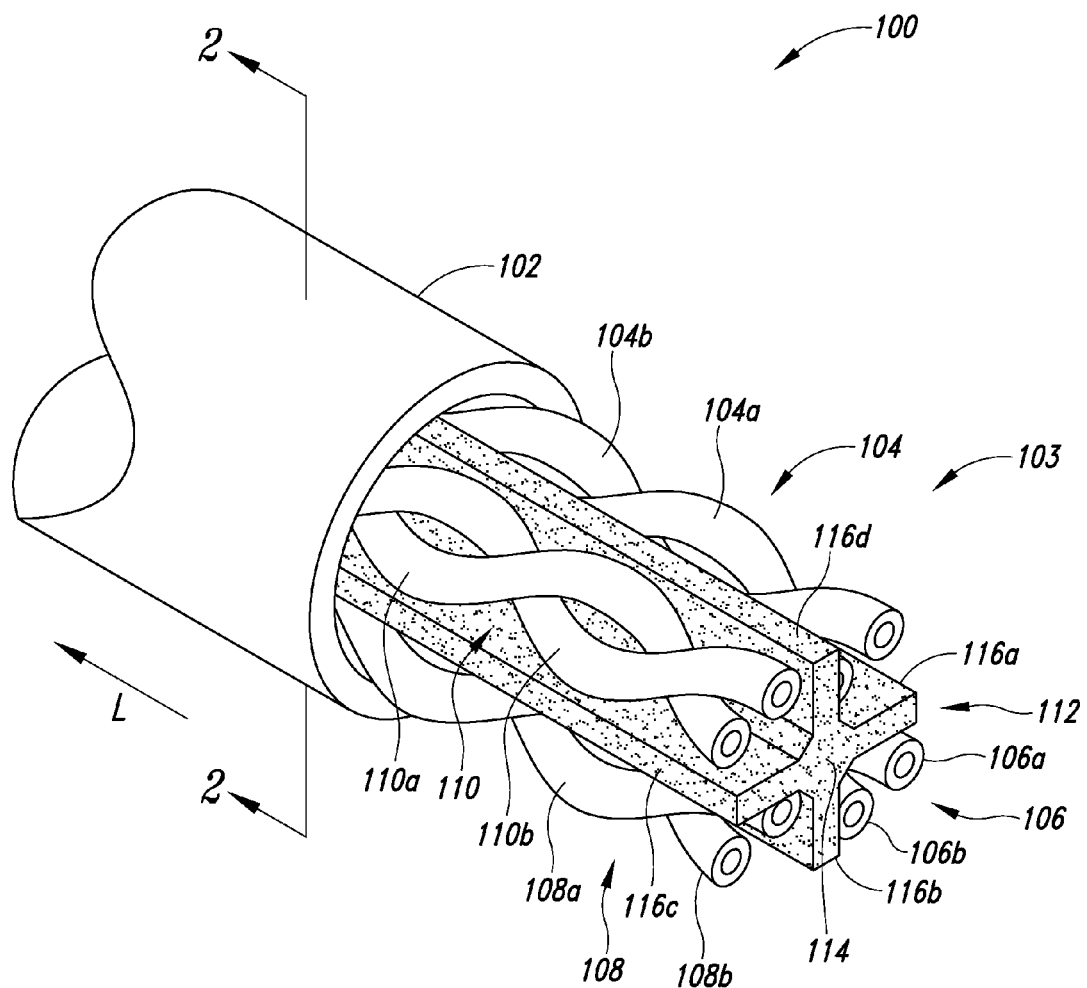
FIG. 1 is a sectional perspective view of a portion of a communication cabling system having a first implementation of a shielding separator.

As will be discussed in greater detail herein, a cabling system has a shielding separator having portions of conductive plastic to shield wire pairs of a communication cabling from one another to reduce possible signal interference between the wire pairs. Implementations of the shielding separator depicted in the drawings and described below have an elongated center member with four elongated members extending therefrom to form an elongated cross or "X" structure when viewed in transverse cross-section.

Various implementations depict conductive material in various locations of the elongated "X" structure as further described below. Although the implementations have taken the form of an elongated "X" structure to shield four wire pairs from one another, other implementations can have other shapes either to also shield four wire pairs or to shield another number of wire pairs such as six wire pairs, etc.

A communication cabling system 100 having a length dimension, L, is shown in FIG. 1 to include a sheathing 102 containing four wire pairs 103 comprising a first wire pair 104 having a first wire 104a and a second wire 104b, a second wire pair 106 having a first wire 106a and a second wire 106b, a third wire pair 108 having a first wire 108a and a second wire 108b, and a fourth wire pair 110 having a first wire 110a and a second wire 110b. The four wire pairs 103 are physically divided from one another by a shielding separator 112 that extends the length dimension, L, of the cabling system 100 along with the four wire pairs.

The shielding separator 112 includes an elongated center member 114 extending along the dimensional length, L. Radially extending outward from the center member 114 are four elongated dividing members 116 including a first elongated divider 116a that separates the first wire pair 104 from the second wire pair 106, a second elongated divider 116b that separates the second wire pair 106 from the third wire pair 108, a third elongated divider 116c that separates the third wire pair 108 from the fourth wire pair 110, and a fourth elongated divider 116d that separates the fourth wire pair 110 from the first wire pair 104.

Figure 2:
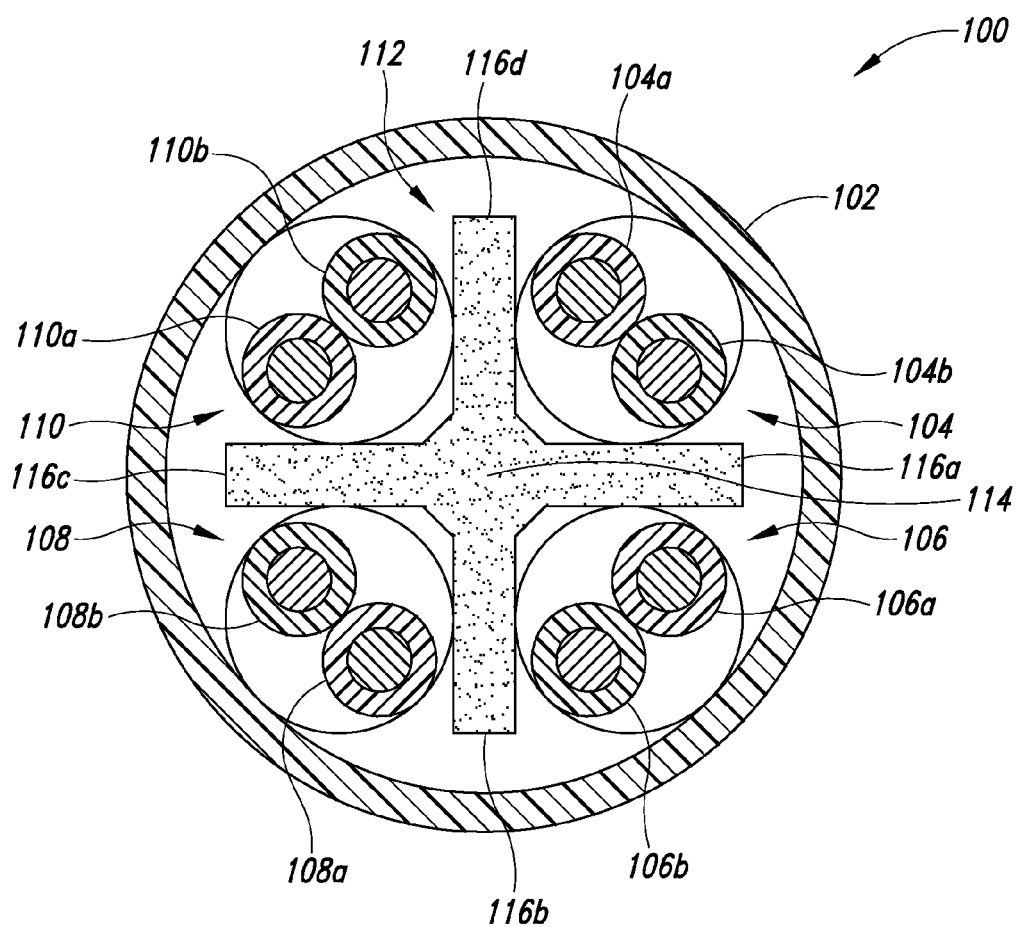
FIG. 2 is a cross-sectional view of the communication cabling system having the first implementation of the shielding separator taken along the 2-2 line of FIG. 1.
Figure 3:
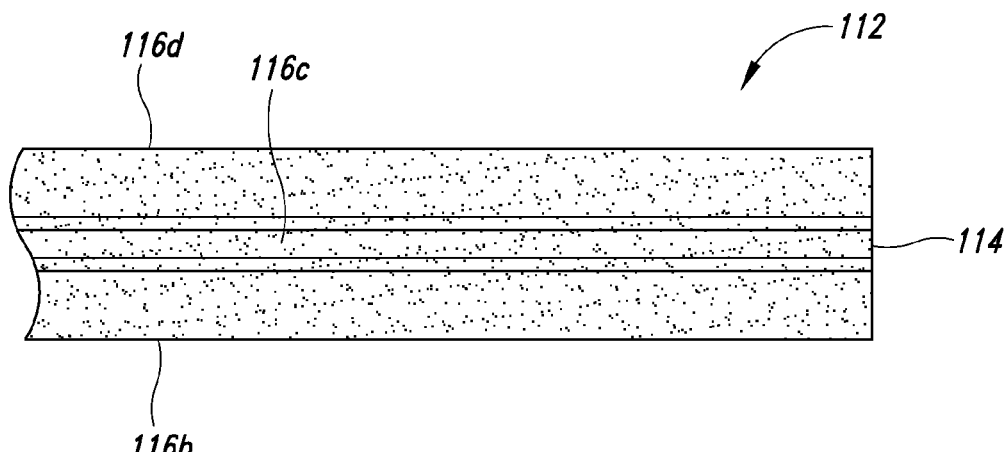
FIG. 3 is a side elevational view of a section of the first implementation of the shielding separator of FIG. 1.

A first implementation of the shielding separator 112 is shown in FIGS. 1-3 with the dividing members 116 extending longitudinally along the elongated center member 114 and formed integrally therewith, with each dividing member projecting radially outward from the elongated center member. The shielding separator 112 has a uniform material construction. All along the dimensional length, L, the elongated center member 114 and the elongated dividing members 116, that can be co-extruded, are made from electromagnetic shielding material (as indicated in the Figures by stippled marking) that, among other things, greatly reduces radio frequency waves from passing therethrough. For instance, in the first implementation, the shielding separator 112 can be of a conductive plastic material such as made from an extruded plastic that is impregnated with metal fibers or other electrically conductive material.

Figure 4:
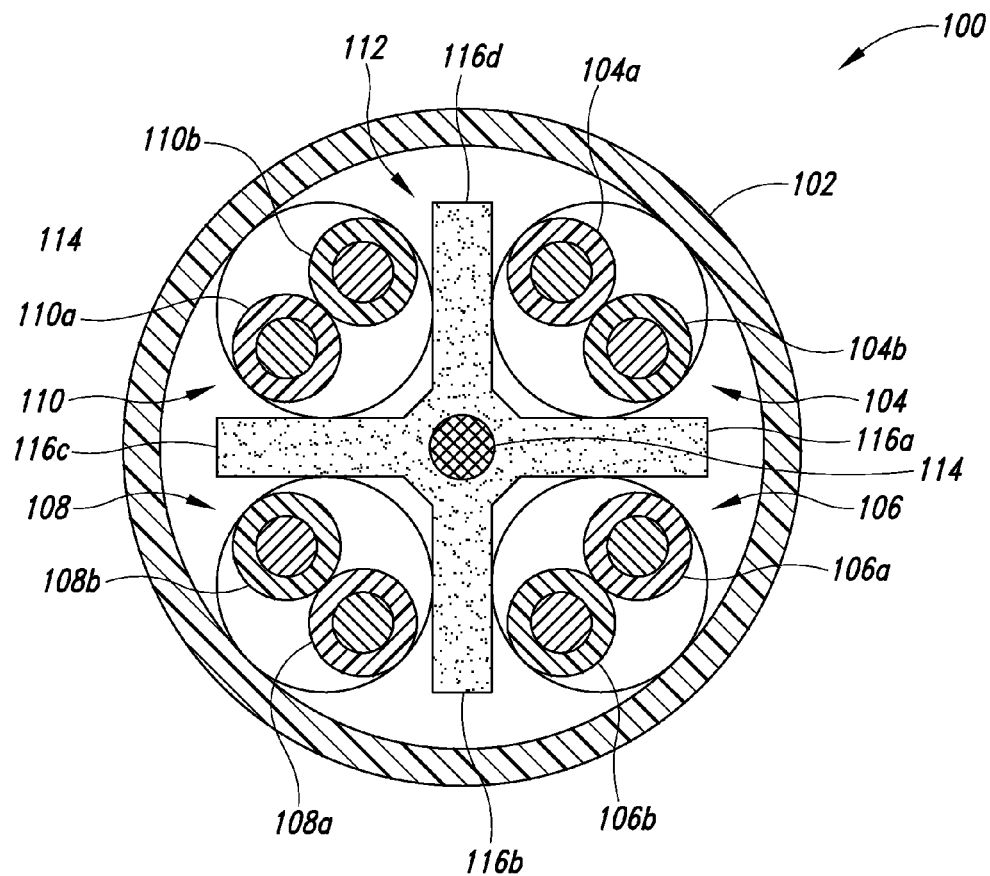
FIG. 4 is a cross-sectional view of a communication cabling system having a second implementation of a shielding separator.
Figure 5:
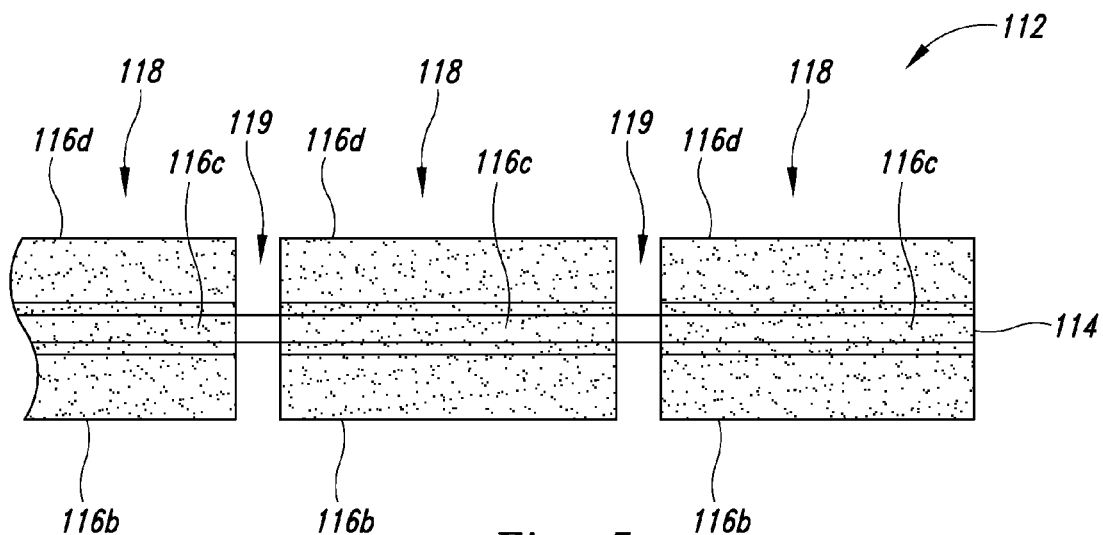
FIG. 5 is a side elevational sectional view of a section of the second implementation of the shielding separator of FIG. 4.

A second implementation of the shielding separator 112 is shown in FIGS. 4-5 in which the elongated center member 114 is of non-conductive material (as indicated in the Figures by hatched marking) and the elongated dividing members 116 are made from electromagnetic shielding material. The elongated center member 114 is shown in FIG. 5 as being continuous whereas the elongated dividing members 116 are shown to be multiple divider sections 118 separated by gaps 119. In the second implementation, the conductive material is not one continuous length to prevent the shielding separator 112 from resonating like an antenna at frequencies such as from 1 MHz to 1 GHz.

Although the divider sections 118 are separated by gaps 119, the elongated non-conductor center member 114 allows the shielding separator 112 to remain as a continuous piece for ease of handling. As with the first implementation, the elongated center member 114 and the elongated dividing members 116 can be co-extruded to form co-extruded member portions of a single member with the elongated center member and the elongated dividing members being formed as an integral unit. Alternatively, other assembly techniques can be used such as cutting the elongated dividing members 116 into the divider sections 118 during assembly.

Figure 6:
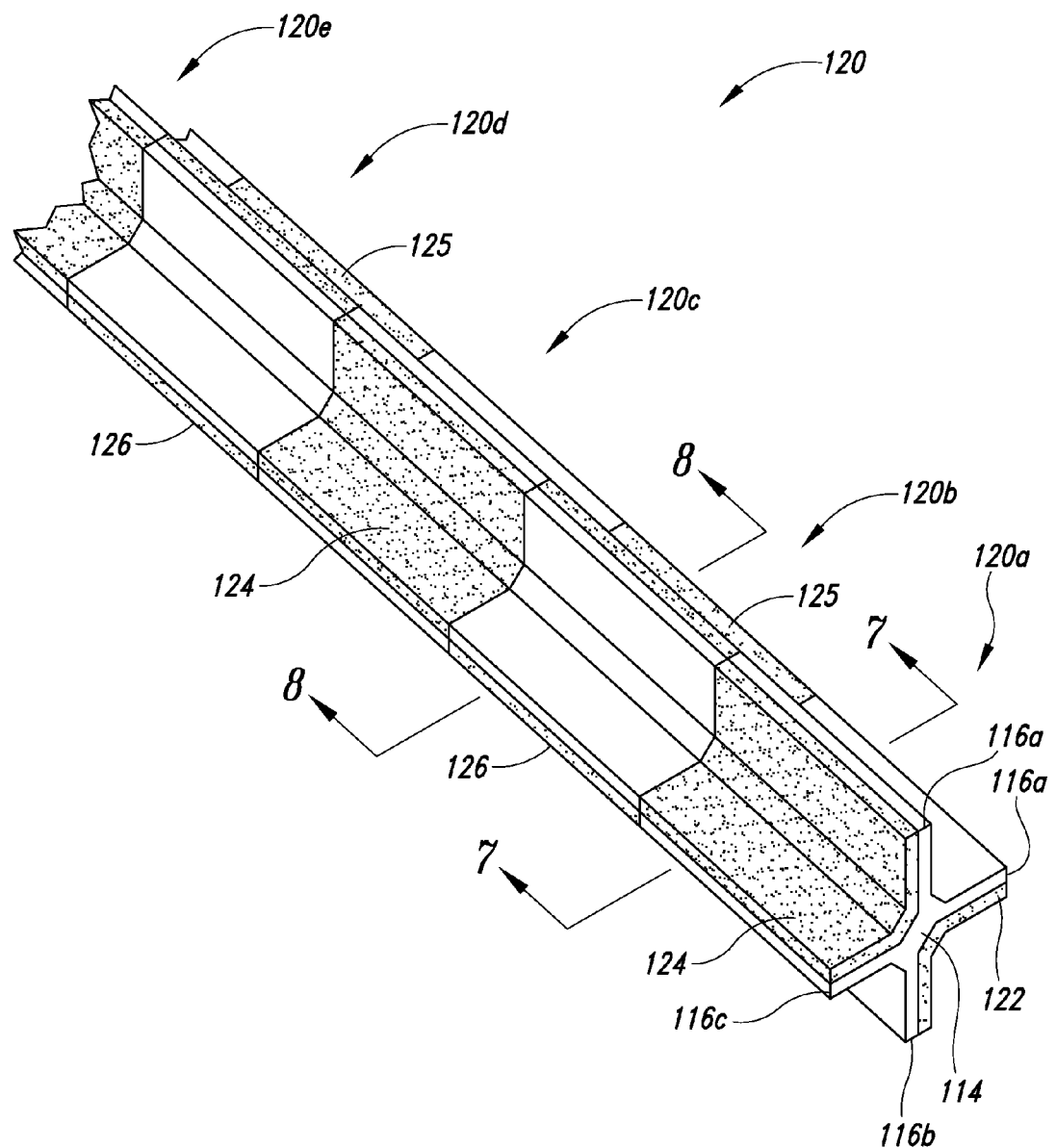
FIG. 6 is a perspective view of a section of a third implementation of a shielding separator.
Figure 7:
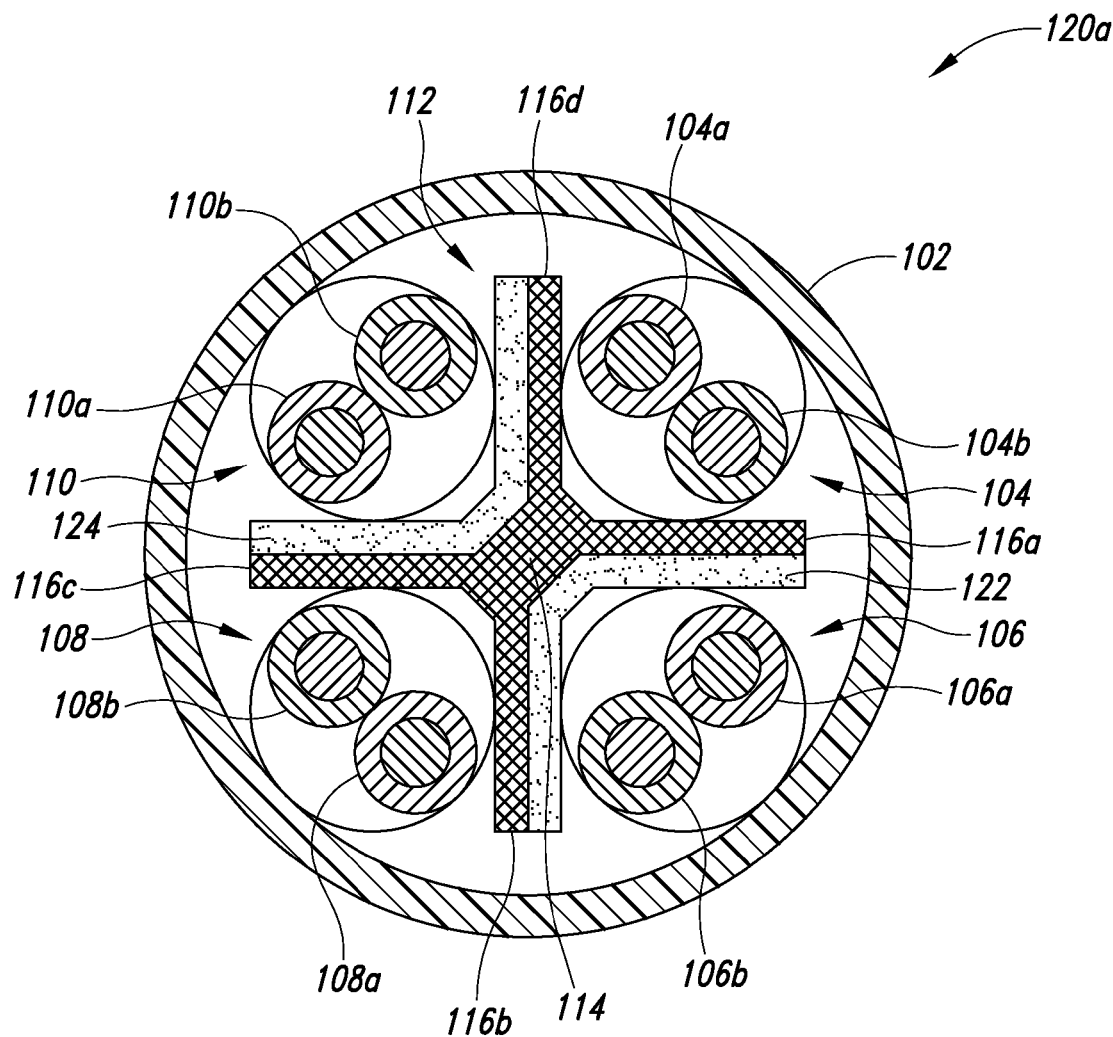
FIG. 7 is a cross-sectional view of a communication cabling system having the third implementation of the shielding separator showing the shielding separator cross-sectioned along the 7-7 line of FIG. 6.
Figure 8:
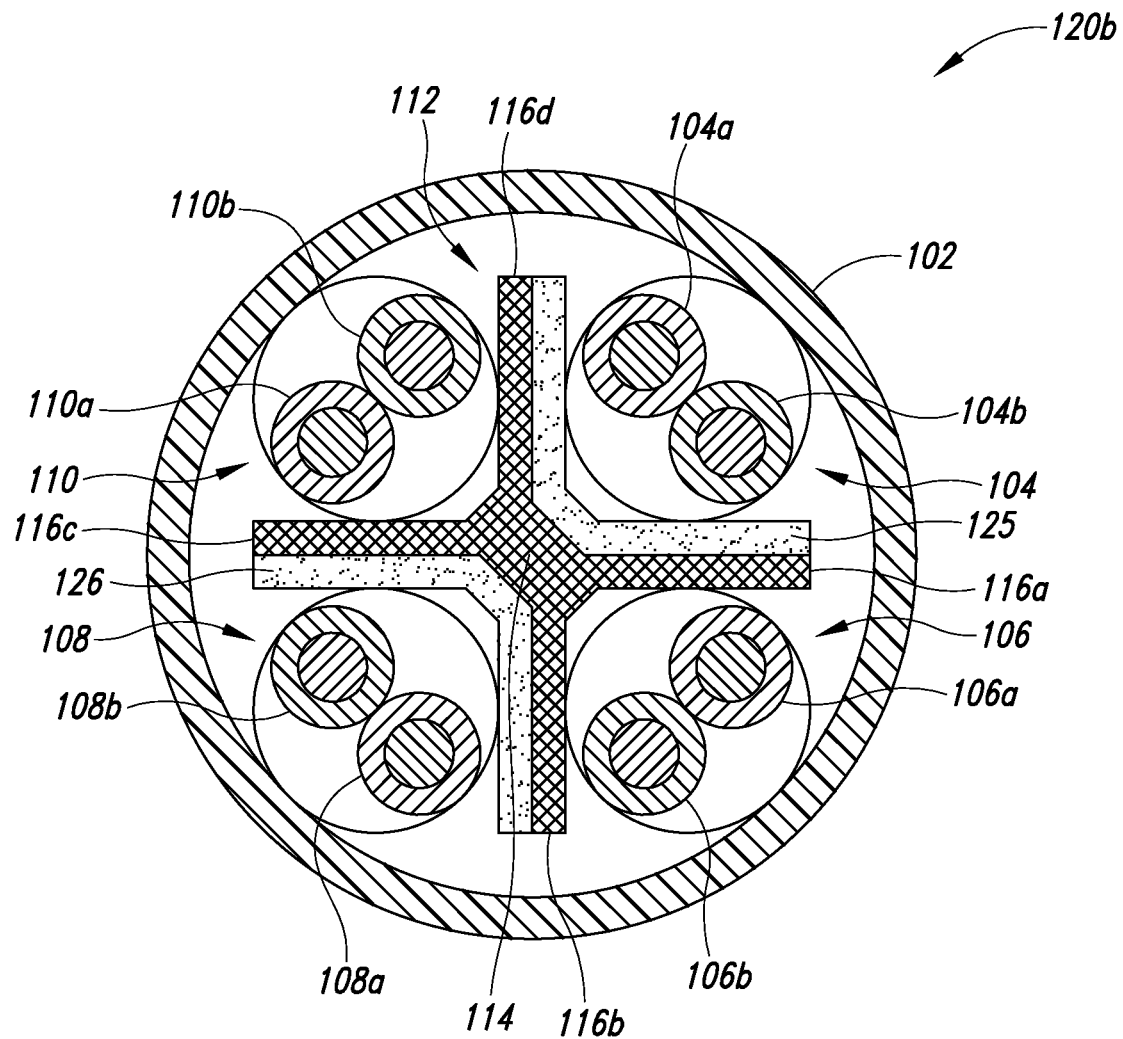
FIG. 8 is a cross-sectional view of the communication cabling system having the third implementation of the shielding separator showing the shielding separator cross-sectioned along the 8-8 line of FIG. 6.

A third implementation of the shielding separator 112 is shown in FIGS. 6-8 as having the elongated center member 114 and the dividing members 116 made from a non-conductive material such as non-conductive plastic. The portion of the shielding separator 112 illustrated is divided into sections 120(a-e) as shown in FIG. 6 to include a first section 120a, a second section 120b, a third section 120c, a fourth section 120d, and a fifth section 120e in end to end relation with other possible sections not shown. The first section 120a of the shielding separator 112, shown in cross section in FIG. 7, has a conductive material layer 122 positioned adjacent the first elongated divider 116a and the second elongated divider 116b facing the second wire pair 106 to reduce interference between the second wire pair and the first wire pair 104, between the second wire pair and the third wire pair 108, and between the second wire pair and the fourth wire pair 110.

The first section 120a of the shielding separator 112 also has a conductive material layer 124 positioned adjacent the third elongated divider 116c and the fourth elongated divider 116d facing the fourth wire pair 110 to reduce interference between the fourth wire pair and the first wire pair 104, between the fourth wire pair and the second wire pair 106, and between the fourth wire pair and the third wire pair 108. To a somewhat lesser degree, the conductive material layer 122 and the conductive material layer 124 substantially shield interference that may occur between the first wire pair 104 and the third wire pair 108 since there is less conductive material therebetween. As depicted, the elongated center member 114 has a greater dimensional width between the first wire pair 104 and the third wire pair 108 than the dimensional width between the second wire pair 106 and the fourth wire pair 110 to compensate for this lack of conductive material between the first wire pair and the third wire pair.

The second section 120b of the shielding separator 112, shown in cross section in FIG. 8, has a conductive material layer 125 positioned adjacent the first elongated divider 116a and the fourth elongated divider 116d facing the first wire pair 104 to reduce interference between the first wire pair and the second wire pair 106, between the first wire pair and the third wire pair 108, and between the first wire pair and the fourth wire pair 110.

The second section 120b of the shielding separator 112, shown in cross section in FIG. 8, also has a conductive material layer 126 positioned adjacent the second elongated divider 116b and the third elongated divider 116c facing the third wire pair 108 to reduce interference between the third wire pair and the first wire pair 104, between the third wire pair and the second wire pair 106, and between the third wire pair and the fourth wire pair 110. To a somewhat lesser degree, the conductive material layer 125 and the conductive material layer 126 substantially shield interference that may occur between the second wire pair 106 and the fourth wire pair 110 since there is less conductive material therebetween. As depicted, the elongated center member 114 has a greater dimensional width between the second wire pair 106 and the fourth wire pair 110 than the dimensional width between the first wire pair 104 and the third wire pair 108 to compensate for this lack of conductive material between the second wire pair and the fourth wire pair.

The adjacent sections of the shielding separator 112 alternate in use of construction with the first and second sections 120a and 120b. For example as shown in FIG. 6, the third section 120c and the fifth section 120e have the conductive material layer 122 and the conductive material layer 124 positioned and the elongated center member 114 shaped as described above for the first section 120a, and the fourth section 120d has the conductive material layer 125 and the conductive material layer 126 positioned and the elongated center member 114 shaped as described above for the second section 120b. The sections 120 are positioned in the shielding separator 112 as described to have sections with the conductive material layer 122 and the conductive material layer 124 alternating with the sections having the conductive material layer 125 and the conductive material layer 126. This is another way for the conductive material to be other than one continuous length to prevent the shielding separator 112 from resonating like an antenna at frequencies such as 1 MHz to 1 GHz.

Figure 9:
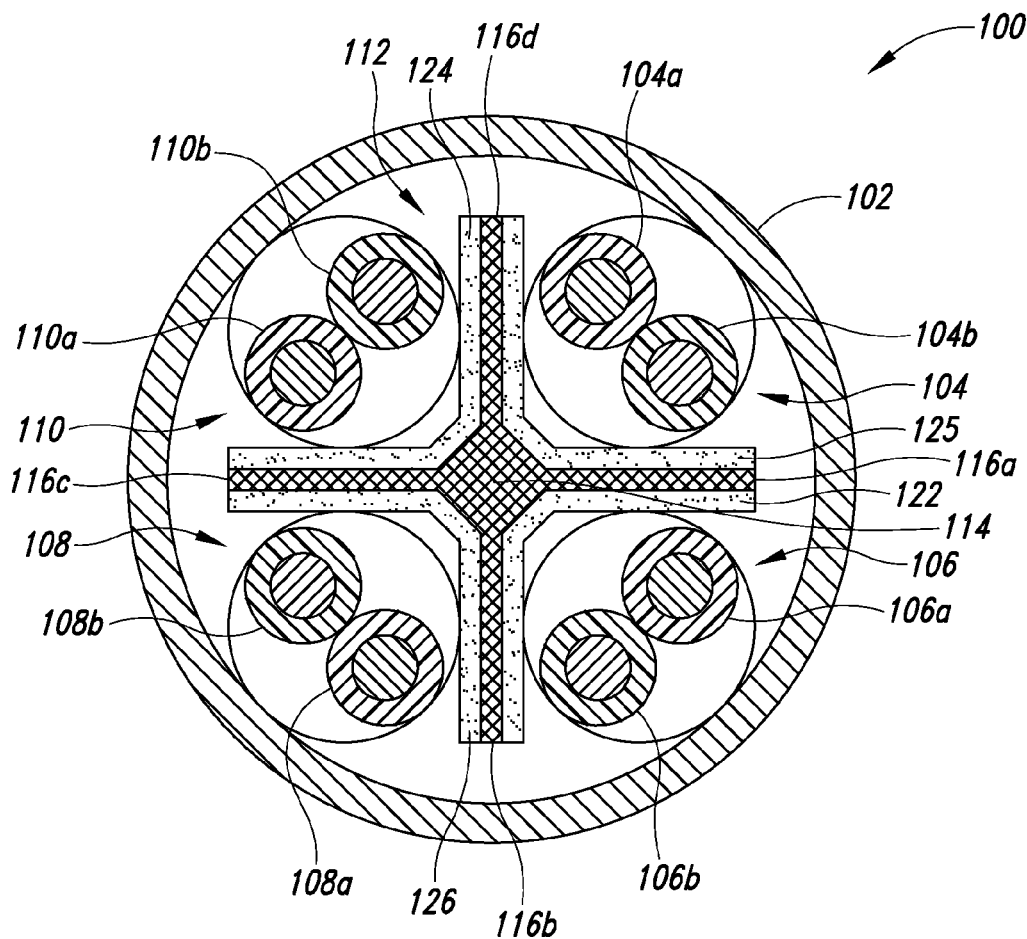
FIG. 9 is a cross-sectional view of a communication cabling system having a fourth implementation of the shielding separator.
Figure 10:
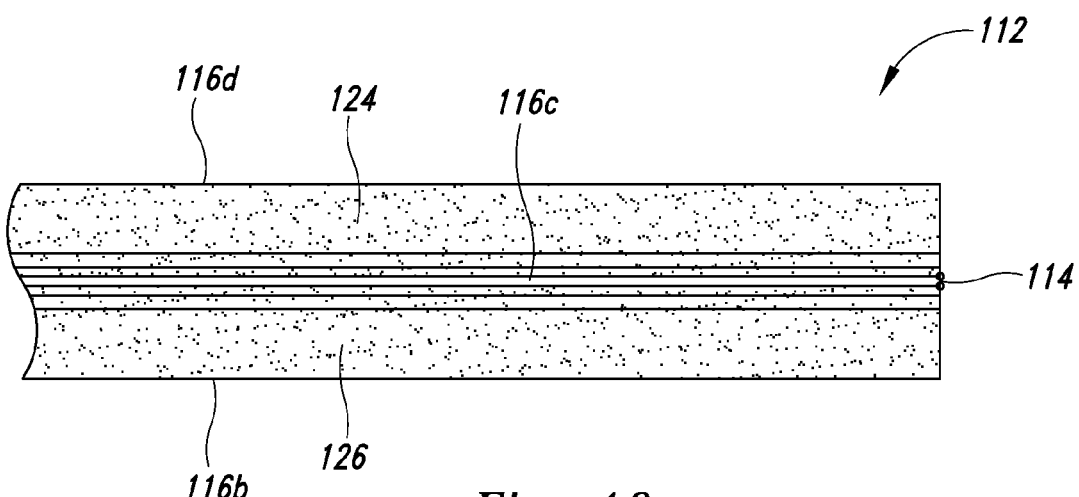
FIG. 10 is a side elevational sectional view of a section of the fourth implementation of the shielding separator.

A fourth implementation of the shielding separator 112 is shown in FIGS. 9-10 as having the elongated center member 114 and the dividing members 116 being made from a non-conductive material such as non-conductive plastic. The shielding separator 112 further includes the conductive material layer 122, the conductive material layer 124, the conductive material layer 125, and the conductive material layer 126 positioned with respect to the elongated dividing members 116 as described above for section 120a (shown in FIG. 7) and section 120b (shown in FIG. 8), respectively.

In the fourth implementation, the conductive material layers 122, 124, 125 and 126 are not alternatively positioned, but are continuous along the length of the elongated dividing members 116. Since all four of the conductive material layers are present at any given portion of the shielding separator 112, the elongated center member 114 can be symmetrically shaped without need for one dimensional width between the first wire pair 104 and the third wire pair 108 being different from the dimensional width between the second wire pair 106 and the fourth wire pair 110.

The fourth implementation is similar to the first implementation since in both, the conductive materials used are continuous through the dimensional length, L, of the cabling system 100. A variation of the fourth implementation can be similar to the second implementation in that the conductive materials are divided into sections and separated by gaps or non-conductive material in order to prevent the shielding separator 112 from resonating like an antenna at frequencies such as 1 MHz to 1 GHz.

Figure 11:
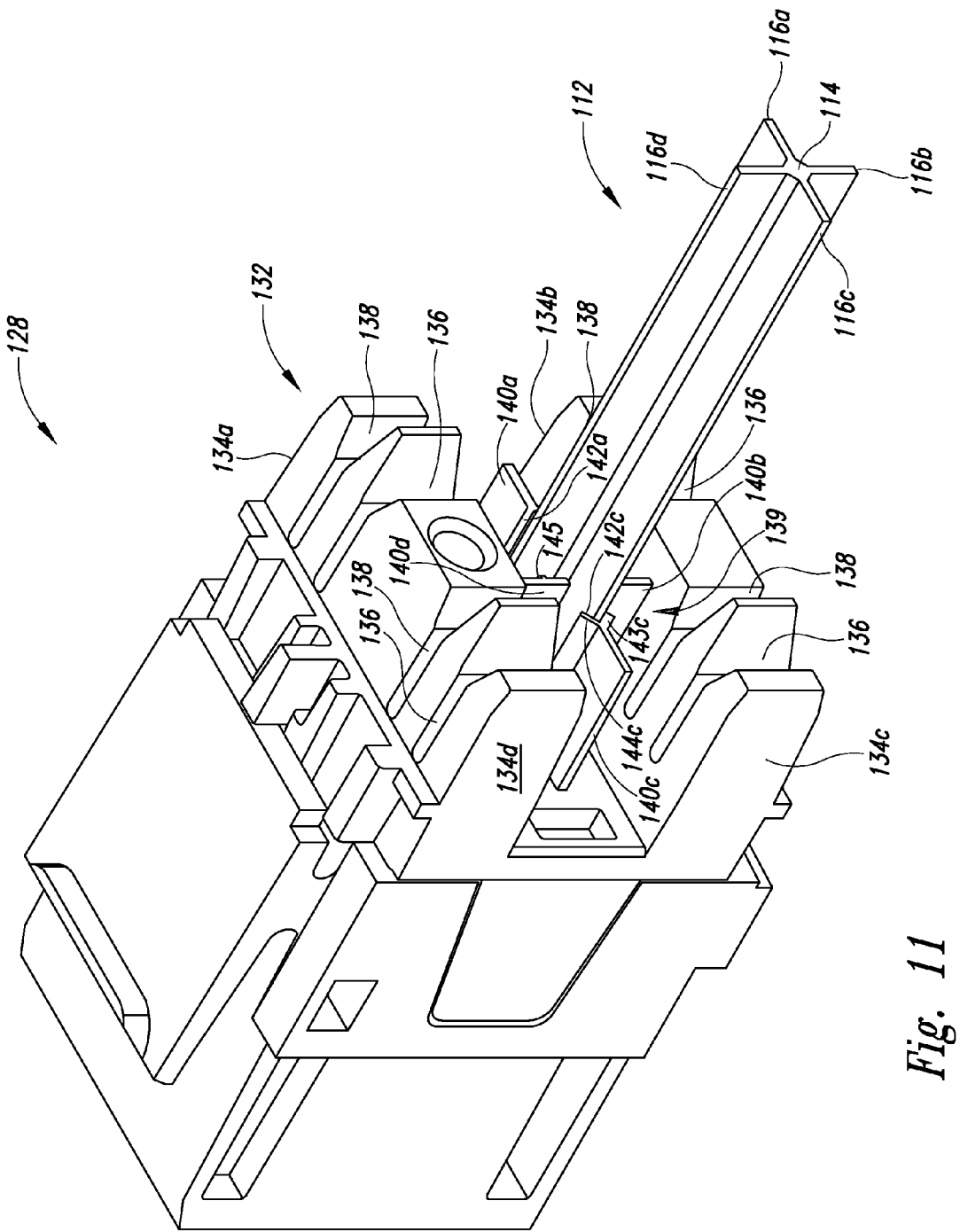
FIG. 11 is a perspective view of a connector having a section of a shielding separator extending therefrom.

An example of the shielding separator 112 used in another context is shown in FIG. 11 where the shielding separator is engaged with a communication connector 128 in the vicinity of a wire pair coupling end 132 of the connector where the wire pairs 103 (see FIG. 1) can be coupled to the connector. As shown, the coupling end 132 has a first coupling portion 134a, a second coupling portion 134b, a third coupling portion 134c, and a fourth coupling portion 134d, each having a first wire slot 136 and a second wire slot 138 to receive wires, as an example, for the first wire pair 104, the second wire pair 106, the third wire pair 108, and the fourth wire pair 110, respectively. The shielding separator 112 in FIG. 11 is depicted as having the construction of the first implementation described above, but other versions can use other of the implementations of the shielding separator, including those described below.

The shielding separator 112 may be held in place by an engagement assembly 139 including one or more positioning members 140A-140D. The positioning members 140A-140D may be positioned to receive the shielding separator 112 therebetween.

The positioning member 140c is positioned alongside a selected side of the elongated dividing member 116c. The positioning member 140c includes a gripping projection 145 that extends toward the selected side of the elongated dividing member 116c. Another positioning member (not shown) that is constructed as a mirror image of the positioning member 140c may be positioned alongside the side of the elongated dividing member 116c that is opposite the selected side of the elongated dividing member 116c. Thus, the elongated dividing member 116c may be received between the positioning member 140c and the positioning member that is its mirror image. Together the positioning member 140c and the positioning member that is its mirror image may grip or clamp the elongated dividing member 116c to maintain engagement between the shielding separator 112 and the connector 128.

The positioning member 140b is positioned alongside a selected side of the elongated dividing member 116b. Like the positioning member 140c, the positioning member 140b may include a gripping projection (not shown) that extends toward the selected side of the elongated dividing member 116c. Another positioning member (not shown) that is constructed as a mirror image of the positioning member 140b may be positioned alongside the side of the elongated dividing member 116b that is opposite the selected side of the elongated dividing member 116b. Thus, the elongated dividing member 116b may be received between the positioning member 140b and the positioning member that is its mirror image. Together the positioning member 140b and the positioning member that is its mirror image may grip or clamp the elongated dividing member 116b to maintain engagement between the shielding separator 112 and the connector 128.

As shown in FIG. 11, the positioning member 140c is generally Y-shaped and positioned adjacent to the elongated dividing member 116c along its distal edge portion. An interior portion 142c is defined between branching portions 143c and 144c of the Y-shaped positioning member 140c. The interior portion 142c is positioned to receive a portion of the distal edge portion of the elongated dividing member 116c. Thus, the Y-shaped positioning member 140c helps maintain the lateral positioning of the shielding separator 112 and the elongated dividing member 116c with respect to the connector 128.

Like the positioning member 140c, the positioning member 140a is generally Y-shaped. The positioning member 140a is positioned adjacent to the elongated dividing member 116a along its distal edge portion. An interior portion 142a is defined between branching portions of the Y-shaped positioning member 140a. The interior portion 142a is positioned to receive a portion of the distal edge portion of the elongated dividing member 116a. Thus, the Y-shaped positioning member 140a helps maintain the lateral positioning of the shielding separator 112 and the elongated dividing member 116a with respect to the connector 128.

The connector 128 may make direct electrical contact with the shielding separator 112. In particular embodiments, the shielding separator 112 may be disposed inside a continuous implantation of a conductive shield 160 (illustrated in FIG. 14 and described below). Such an embodiment may be configured to provide electrical contact between the shielding separator 112 and shield and grounding structures of the connector 128. The engagement assembly 139 may add mechanical stability to the connector-cable interface to aid in the termination process by stabilizing the position of the connector 128 and cable during wire positioning and wire termination.

Electromagnetic ("EM") signal propagation establishes relationships between interactive spatial entities constructed from materials that react with electromagnetic waves, and a propensity for selective frequency responses. Resonance is the tendency of a system to oscillate at larger amplitude at some frequencies rather than at others. These frequencies are known as resonant frequencies (or resonance frequencies). Resonance phenomena occur with all types of vibrations or waves, including electromagnetic resonance. At resonant frequencies, even small periodic driving forces can produce large electromagnetic vibrations, because the system stores electromagnetic vibrational energy.

Resonant systems can be used to pick out specific frequencies in a complex vibration containing many frequencies. For example, a radio transmitter may have a first antenna with a length favoring resonance at the transmitter's frequency. A radio receiver for the electromagnetic signal transmitted by the transmitter may have a second antenna with a length favoring resonance at the transmitter's frequency. Thus, a receiving antenna is typically tuned for a specific resonant frequency, and is effective at receiving signals over a range of frequencies that are usually centered about that resonant frequency.

The "resonant frequency" and "electrical resonance" of the antenna is related to its electrical length. The electrical length is usually the physical length of the wire divided by its velocity factor (the ratio of the speed of wave propagation in the wire to the speed of light in a vacuum). Thus, as is appreciated by those of ordinary skill in the art, a relationship exists between wire length and resonance. Similarly, if the antenna is long enough and a signal is applied to the antenna along its length at intervals equal to the inverse of its resonant frequency (i.e., at its resonant wavelength), the antenna will resonate. The antenna will also resonate at multiples of its resonant frequency (i.e., harmonics). Any integral half-wavelength that fits substantially within the length of the antenna is also favored and will cause the antenna to resonate.

Figure 12:
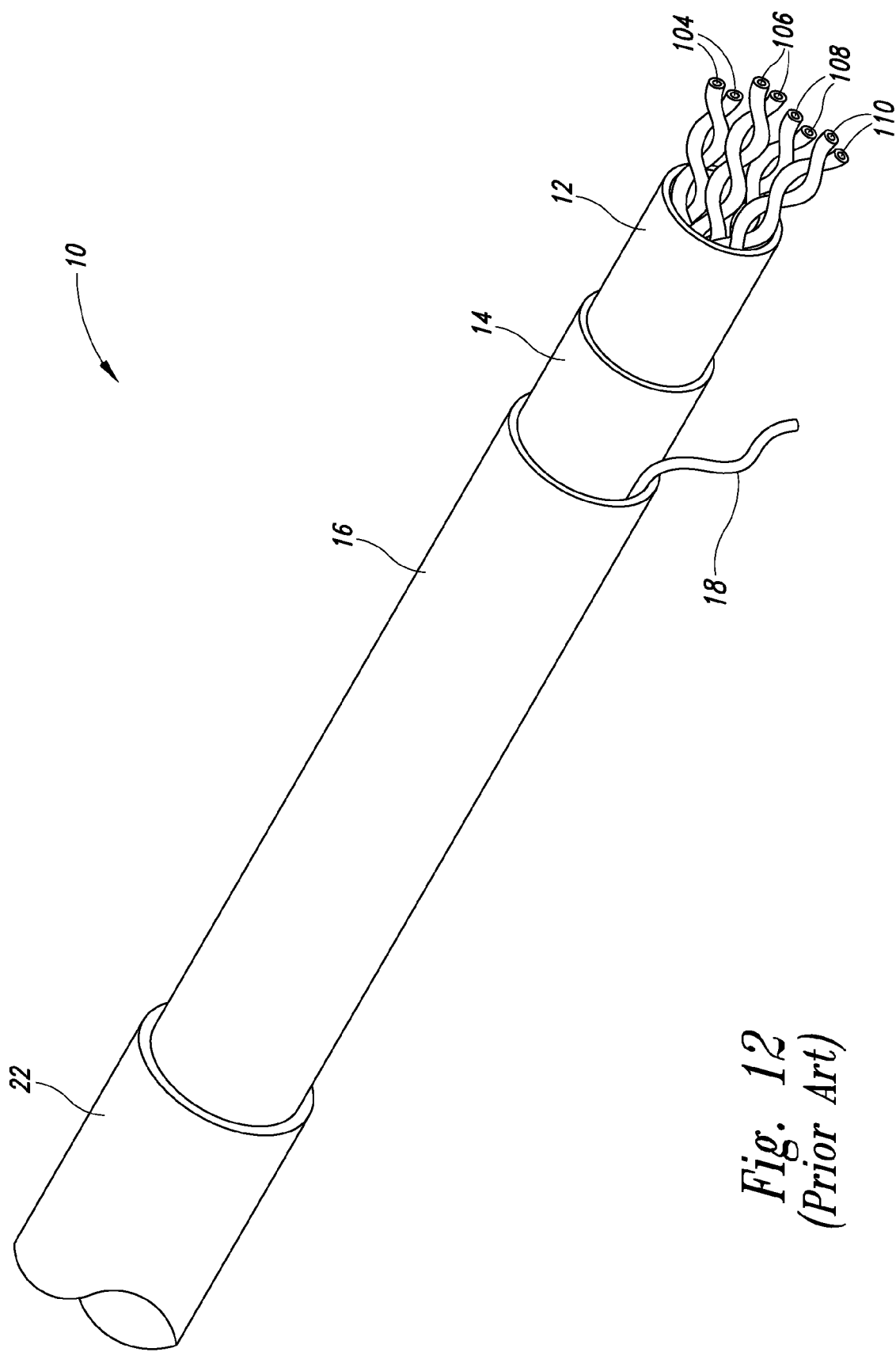
FIG. 12 is a perspective view of a prior art communication cable having a conventional shield system.

Turning to FIG. 12, each of the wires 104a, 104b, 106a, 106b, 108a, 108b, 110a, and 110b of the prior art communication cable 10 can behave as a frequency selective antenna. Depending upon the implementation details, the communication cable 10 can be quite long and therefore vulnerable to exposure to signals related to the geometry of the wires 104a, 104b, 106a, 106b, 108a, 108b, 110a, and 110b as well as at their fundamental resonant frequencies. To limit induction of a signal in one or more of the wires 104a, 104b, 106a, 106b, 108a, 108b, 110a, and 110b, it is desirable to avoid exposing each of the wires to a signal (external to the cable or carried by another wire of the cable) that causes the wire to acquire undesired signals.

The wires of a balanced transmission line wire pair, such as the wires 104a and 104b of the twist pair 104, are twisted together to avoid near-range crosstalk by continually reversing the magnetic and electric fields so as to cancel signals from adjacent twisted pairs (e.g., the twist pairs 106, 108, and 110). If the twist rates of two or more of the pairs match (or are coincident), the benefit of the twists may be lost because signals from adjacent twisted pairs are inadequately cancelled.

Figure 13:
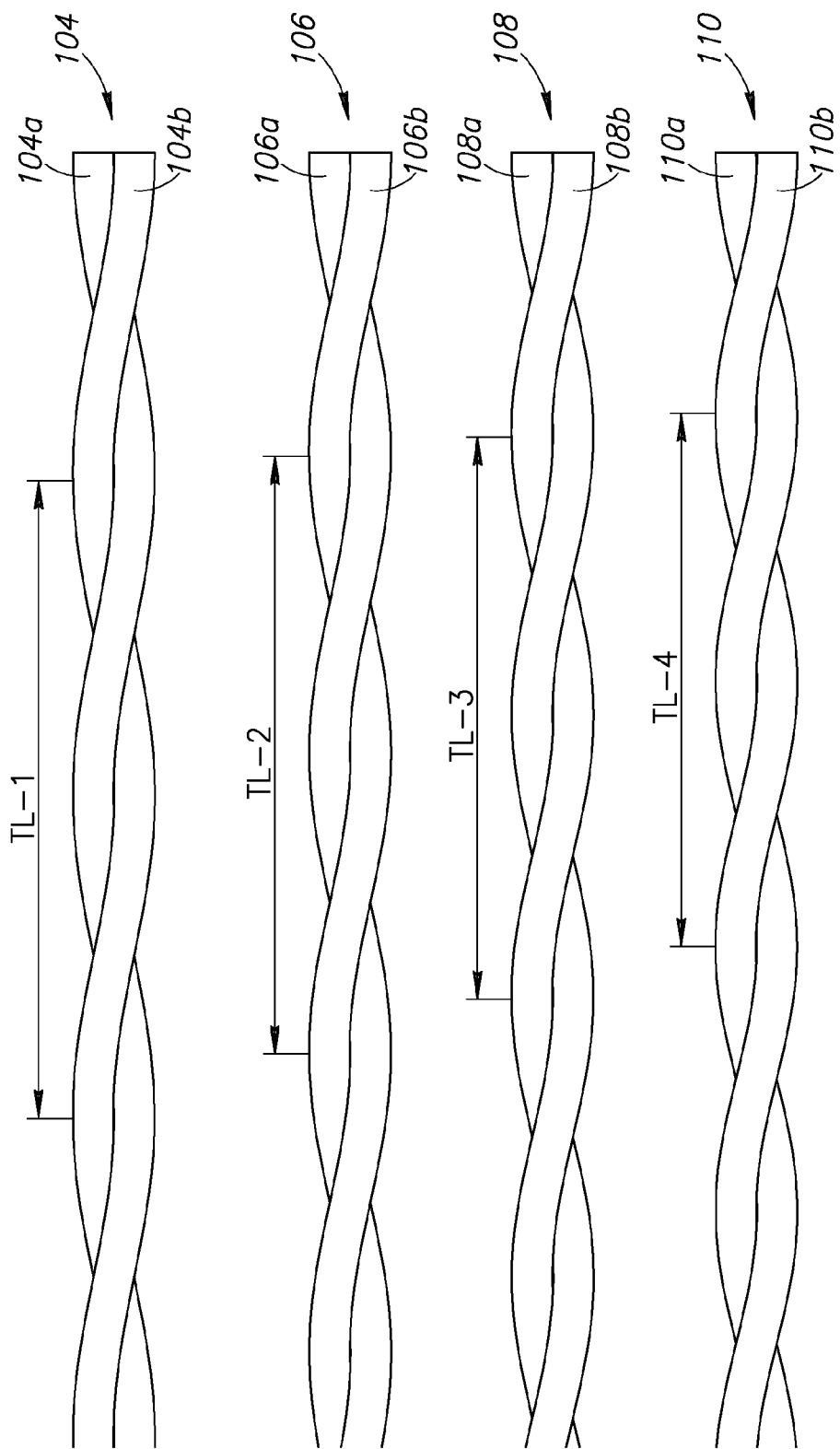
FIG. 13 is a side view of four twisted wire pairs of the prior art cable of FIG. 12 illustrating their twist rates.

Referring to FIG. 13, in the conventional communications cable 10, the wires of each of the twisted pairs 104, 106, 108, and 110 are twisted together at a generally uniform twist rate. Thus, the twists in the twisted pairs introduce a periodicity. The twist rates of the twisted pairs 104, 106, 108, and 110 typically range from about 0.1 inches to about 1.0 inches. By way of a non-limiting example, the twist length "TL-1" of the wires 104a and 104b of the first twisted pair 104 (which in some commercial embodiments may have blue colored outer layers of insulation) may be about 0.350 inches. The twist length "TL-2" of the wires 106a and 106b of the second twisted pair 106 (which in some commercial embodiments may have orange colored outer layers of insulation) may be about 0.425 inches. Thus, inside the cable, every 17th twist of the first twisted pair (having a twist length of about 0.35 inches) will be adjacent every 14th twist of the second twisted pair (having a twist length of about 0.425 inches). In other words, in this example, the first and second twisted pairs are "coincident" about every 5.97 inches.

The twist length "TL-3" of the wires 108a and 108b of the third twisted pair 108 (which in some commercial embodiments have green colored outer layers of insulation) may be about 0.382 inches. The twist length "TL-4" of the wires 110a and 110b of the fourth twisted pair 110 (which in some commercial embodiments may have brown colored outer layers of insulation) may be about 0.475 inches.

As is apparent to those of ordinary skill in the art, a twisted pair that is terminated in its characteristic impedance is a matched system transmission line that does not have signals/energy bouncing from one end to the other end of the balanced transmission line. Such a matched transmission line has no resonances from an end-to-end transmission line signal flow perspective. However, due to the twists, the balanced transmission line can act as an antenna and thus favor or prefer to acquire (or emit) energy at certain frequencies related to the length/pitch of the twists. In other words, the balanced transmission line can act as a collinear antenna due to its twist geometry and a slight amount of leakage caused by imperfectly contained fields of the type typically suffered by unshielded differential pairs. Therefore, one or more of the twisted pairs 104, 106, 108, and 110 may acquire interference from the operating frequencies of the cable 10, which is not based alone or in part on resonance.

The four twisted pairs 104, 106, 108, and 110 may be twisted together as a unit in a "bundle," which also has a twist rate. This mixes up the coincidences of interaction with nearby cables of like or similar construction. The bundle of the four twisted pairs may have a twist length of about five inches.

While exemplary twist lengths have been provided for illustrative purposes, those of ordinary skill in the art appreciate that other twist lengths may be used and that the present teachings are not limited to the twist lengths provided.

Referring again to FIG. 12, the conductive and dielectric materials used to construct the cable 10 interact with internal electromagnetic signals carried by the cable and external electromagnetic signals originating from external signal sources in the environment. The periodic structure of the cable 10, including the twist rates of the four twisted pairs 104, 106, 108, and 110 and the bundle, cause the cable 10 to have a frequency selective nature. In other words, the coincidences of the periodic structures (e.g., the wires 104a, 104b, 106a, 106b, 108a, 108b, 110a, and 110b of the twisted pairs 104, 106, 108, and 110, and the bundle) within the cable 10 may cause one or more of the twisted pairs to favor a response to an external signal originating from an external signal source (not shown) and/or an internal signal carried by one of the twisted pairs 104, 106, 108, and 110. Thus, the favored external or internal signal may introduce crosstalk into the cable 10.

Figure 14:
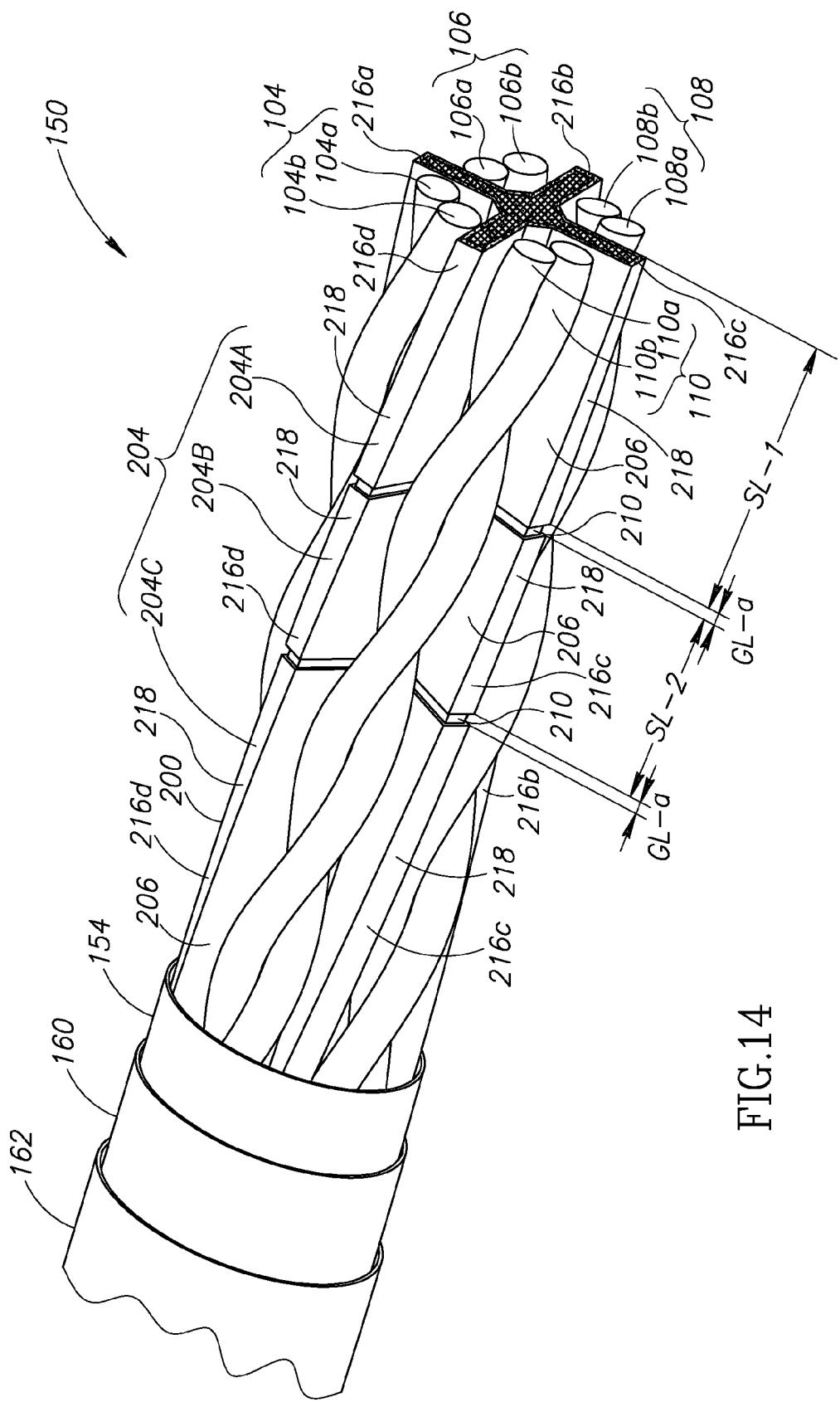
FIG. 14 is a perspective view of a communication cable having a discontinuous shielding separator with a plurality of separator sections.
Figure 15:
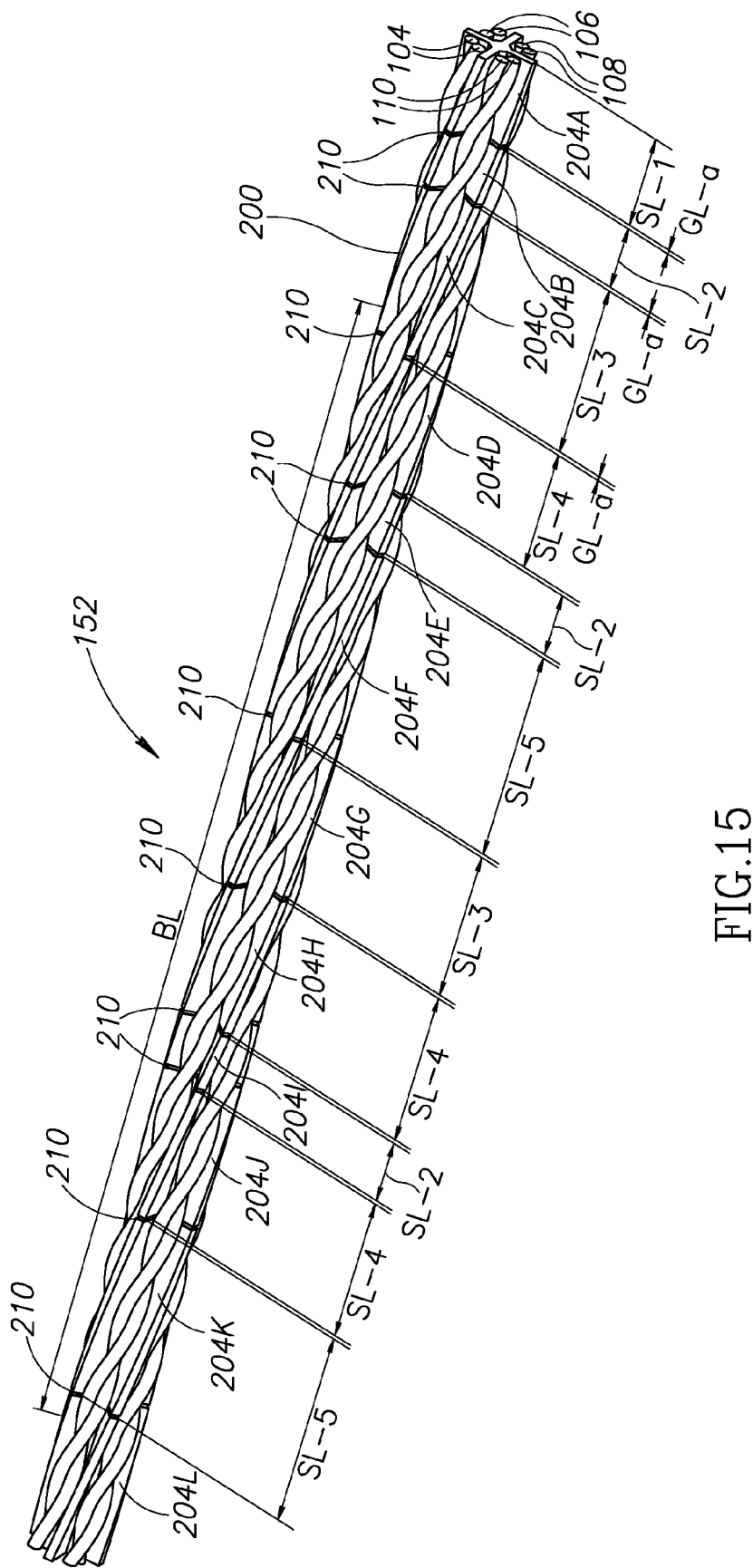
FIG. 15 is a perspective view of the communication cable of FIG. 14 with its optional insulating sheath, optional continuous or discontinuous conductive shield, and external insulating sheath removed.

FIG. 14 illustrates a cable 150 including the wires 104a and 104b twisted to form the twisted pair 104, the wires 106a and 106b twisted to form the twisted pair 106, the wires 108a and 108b twisted to form the twisted pair 108, and the wires 110a and 110b twisted to form the twisted pair 110. As best shown in FIG. 15, the twisted pairs 104, 106, 108, and 110 are further twisted together to form a bundle 152. The bundle 152 has a twist period "BL" that can be, and typically is, longer (i.e., has lower twist rate) than the twist periods of wires of the twisted pairs 104, 106, 108, and 110.

The bundle 152 (see FIG. 15) is covered by an optional insulating sheath 154 (see FIG. 14), which may include one or more layers of the same or different materials. For example, the insulating sheath 154 may include the internal sheath 12 (see FIG. 12) and the insulation 14 (see FIG. 12). The bundle 152 may also covered by an optional continuous or discontinuous conductive shield 160 (see FIG. 14). In embodiments including the insulating sheath 154 and the conductive shield 160, the insulating sheath 154 is positioned between the bundle 152 and the conductive shield 160. In embodiments in which the conductive shield 160 is discontinuous, the cable 150 does not include the drain wire 18 illustrated in FIG. 12. The bundle 152 may also be covered by an external insulating jacket or sheath 162. The external insulating sheath 162 may be substantially similar to the external sheath 22 (see FIG. 1). In embodiments including the conductive shield 160, the external insulating sheath 162 covers the conductive shield 160 and electrically insulates the conductive shield 160 from the external environment.

The cable 150 also includes a discontinuous shielding separator 200, which may be viewed as a fifth implementation of the shielding separator 112 described above and illustrated in FIGS. 1-11. The shielding separator 200 is configured to extend longitudinally inside the cable 150 and to be positioned between twisted pairs 104, 106, 108, and 110 inside the cable 150. Further, the twisted pairs 104, 106, 108, and 110 and the shielding separator 200 are illustrated as being twisted together in the bundle 150. As may be viewed in FIG. 15, the bundle 152 has a twist length "BL," which in a conventional communication cable may be about 5.000 inches.

The shielding separator 200 includes a plurality of discontinuous separator sections 204 arranged longitudinally in a series along the cable 150. The separator sections 204 are described as being discontinuous because they are electrically separate or discontinuous with respect to one another. However, in various embodiments, the separator sections 204 may be physically connected by one or more non-conductive portions. In FIG. 14 three separator sections 204A, 204B and 204C are illustrated. Each of the separator sections 204 is electrically conductive along at least a portion of its outer surface 206. Therefore, each separator section 204 may carry an electrical signal. However, as mentioned above, each of the separator sections 204 is in electrical isolation from the other separator sections of the shielding separator 200. Therefore, the separator sections 204 cannot carry a signal over the length of the shielding separator 200.

Each of the separator sections 204 has a generally cross-shaped, cruciform shaped, or X-shaped cross-sectional shape that includes a first elongated divider 216a that separates the first wire pair 104 from the second wire pair 106, a second elongated divider 216b that separates the second wire pair 106 from the third wire pair 108, a third elongated divider 216c that separates the third wire pair 108 from the fourth wire pair 110, and a fourth elongated divider 216d that separates the fourth wire pair 110 from the first wire pair 104. Each of the elongated dividers 216a-216d has a distal edge portion 218. As is appreciated by those of ordinary skill in the art, the cross-shaped, cruciform shaped, or X-shaped cross-section shapes are provided as examples of geometric configurations that may be used to construct the separator sections 204 and other separator isolation gap geometries including, but not limited to, non-transverse and non-planar geometries, are within the scope of the various implementations.

To limit induction of a signal in one of the wires 104a, 104b, 106a, 106b, 108a, 108b, 110a, and 110b by exposing the wire to the electrical signal carried by the shielding separators 200 in a manner that couples a signal onto the wire, the separator sections 204 should be generally aperiodic, ideally approaching complete randomization, with respect to the twists in the twisted pairs 104, 106, 108, and 110. As is apparent to those of ordinary skill in the art, if the separator sections 204 each had the same length, the separator sections 204 could be periodic with each of the twist rates of the twisted pairs 104, 106, 108, and 110 over a different number of twists for each twisted pair. This periodicity could induce a signal on one or more of the wires of the twisted pairs 104, 106, 108, and 110. Further, if the separator sections 204 are constructed to have more than one length but are arranged in regular or repeating pattern, the periodicity could induce a signal on one or more of the wires of the twisted pairs 104, 106, 108, and 110. For these reasons, it is desirable to use separator sections 204 having different lengths and to avoid arranging the separator sections 204 longitudinally in a repeating pattern. It may be beneficial to position each of the separator sections 204 within in the series such that each separator section is aperiodic with others of the separator sections having the same length. In such an arrangement, each separator section 204 having a particular length is positioned within in the series such that the separator section is separated by a different distance from each of the others of the separator sections having the same length.

However, it is recognized that strict (or pure) aperiodicity may be unachievable depending upon the length of the cable 150, the number of different lengths used to construct the separator sections 204, and the number of separator sections 204 used to construct the cable 150. Nevertheless, to the extent possible, it is beneficial for the separator sections 204 to be aperiodic with respect to the twists in the wires 104a, 104b, 106a, 106b, 108a, 108b, 110a, and 110b of the twisted pairs 104, 106, 108, and 110. In other words, it is desirable to use separator sections 204 that are not coincident with the twists in the wires of the twisted pairs 104, 106, 108 and 110, and 110b over as many twists as possible. For example, the separator sections may be arranged in a serial or longitudinal arrangement that does not have a repeating portion within a distance that is long enough to avoid a significant amount of internal and/or external crosstalk. For example, the separator sections 204 may be arranged in a serial or longitudinal arrangement that does not have a repeating portion within at least several feet.

As is apparent to those of ordinary skill in the art, it may be desirable to arrange the separator sections 204 in a serial or longitudinal arrangement that does not have a repeating portion within a distance that is as long as possible given practical considerations. By way of non-limiting examples, the separator sections 204 may be arranged in a serial or longitudinal arrangement that does not have a repeating portion within a distance of 2, 3, 4, 5, 10, 15, or 20 feet. By way of another non-limiting example, the separator sections 204 may be positioned within the serial or longitudinal arrangement such that the arrangement does not have a portion that repeats within a predetermined distance having a length between about 4 inches and about 20 feet. However, longer and shorter distances may be used and the present teachings are limited to any particular distance.

Alternatively, the separator sections 204 may be arranged in a serial or longitudinal arrangement that repeats over a distance that is long enough to avoid a significant amount of internal and/or external cross-talk. For example, the arrangement may repeat over a distance that ranges from less than about one inch to many feet. As is apparent to those of ordinary skill in the art, it may be desirable to arrange the separator sections 204 in a serial or longitudinal arrangement that repeats over a repeating distance that is as long as possible given practical considerations. By way of non-limiting examples, the separator sections 204 may be arranged such that the arrangement repeats every 2, 3, 4, 5, 10, 15, or 20 feet. By way of another non-limiting example, the separator sections 204 may be arranged such that the arrangement repeats every 10, 20, 25, 50, or 100 meters. By way of yet another non-limiting example, the separator sections 204 may be arranged such that the arrangement repeats about every 10 centimeters to about every 100 meters. In such an embodiment, the repeating portion has a length within a range of about 10 centimeters to about 100 meters. However, longer and shorter repeating distances may be used and the present teachings are limited to any particular repeating distance.

It may also be desirable to select lengths for the separator sections 204 that have resonant frequencies that are greater than the maximum operating frequency and/or other operating frequencies of the cable 150. For example, the separator sections 204 may each have a different length that is less than about five inches based on present cable maximum operating frequencies. As those skilled in the art will appreciate, as maximum operating frequencies increase, the desirable maximum length of separator 204 would decrease.

Signal transmission to and from the cable 150 may occur when the cable 150 is located in an environment in which other nearby external signal sources, such as telephone lines, local area networks, television systems, and the like, are also present. However, the lengths of the separator sections 204 may be selected to avoid resonance at the frequencies of distant external signals originating from external signal sources thereby avoiding "coincidental lengths" (i.e., lengths that are coincident with "airborne" signal wavelengths originating from external signal sources in the environment). Further, the separator sections 204 may be arranged in an aperiodic manner such that the separator sections 204 do not resonate on the same frequency (or frequencies) used by the external signals originating from external signal sources in the environment.

FIG. 15 illustrates twelve linearly arranged separator sections 204A to 204L, each in electrical isolation from the other separator sections of the shielding separator 200. The separator sections 204A to 204L are constructed using a predetermined number of lengths. In the embodiment illustrated, five different lengths have been used. The separator section 204A has a first length "SL-1," the separator section 204B has a second length "SL-2," the separator section 204C has a third length "SL-3," the separator section 204D has a fourth length "SL-4," and the separator section 204F has a fifth length "SL-5." The other separator sections 204E and 204G to 204L have one of the lengths "SL-1," to "SL-5." For example, the separator section 204E has the length "SL-2," the separator section 204G has the length "SL-3," the separator section 204H has the length "SL-4," the separator section 204I has the length "SL-2," the separator section 204J has the length "SL-4," and the separator section 204K has the length "SL-5."

Figure 22:
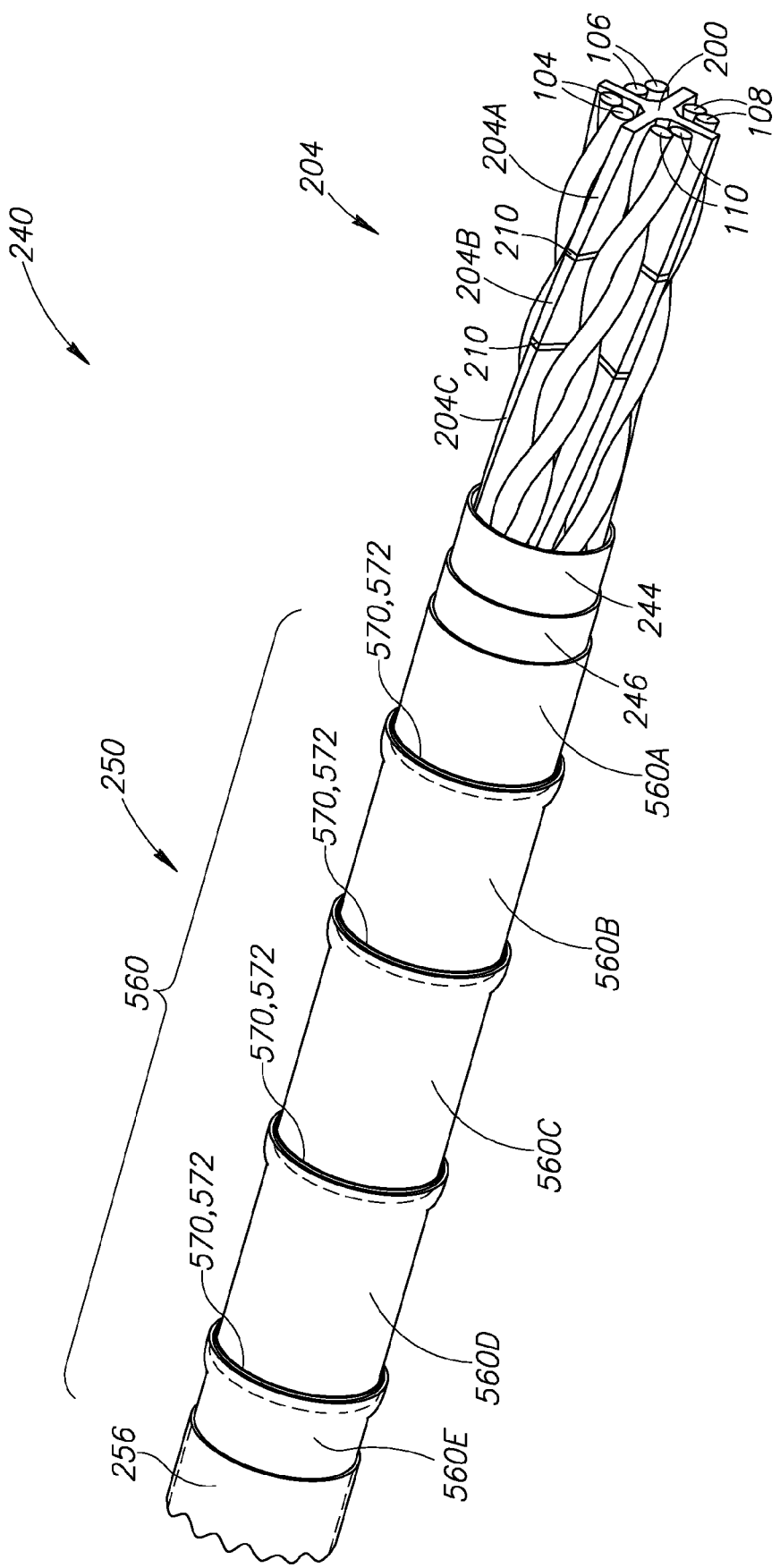
FIG. 22 is a perspective view of the communication cable of FIG. 20 incorporating another alternate implementation of the discontinuous conductive shield.
Figure 23:
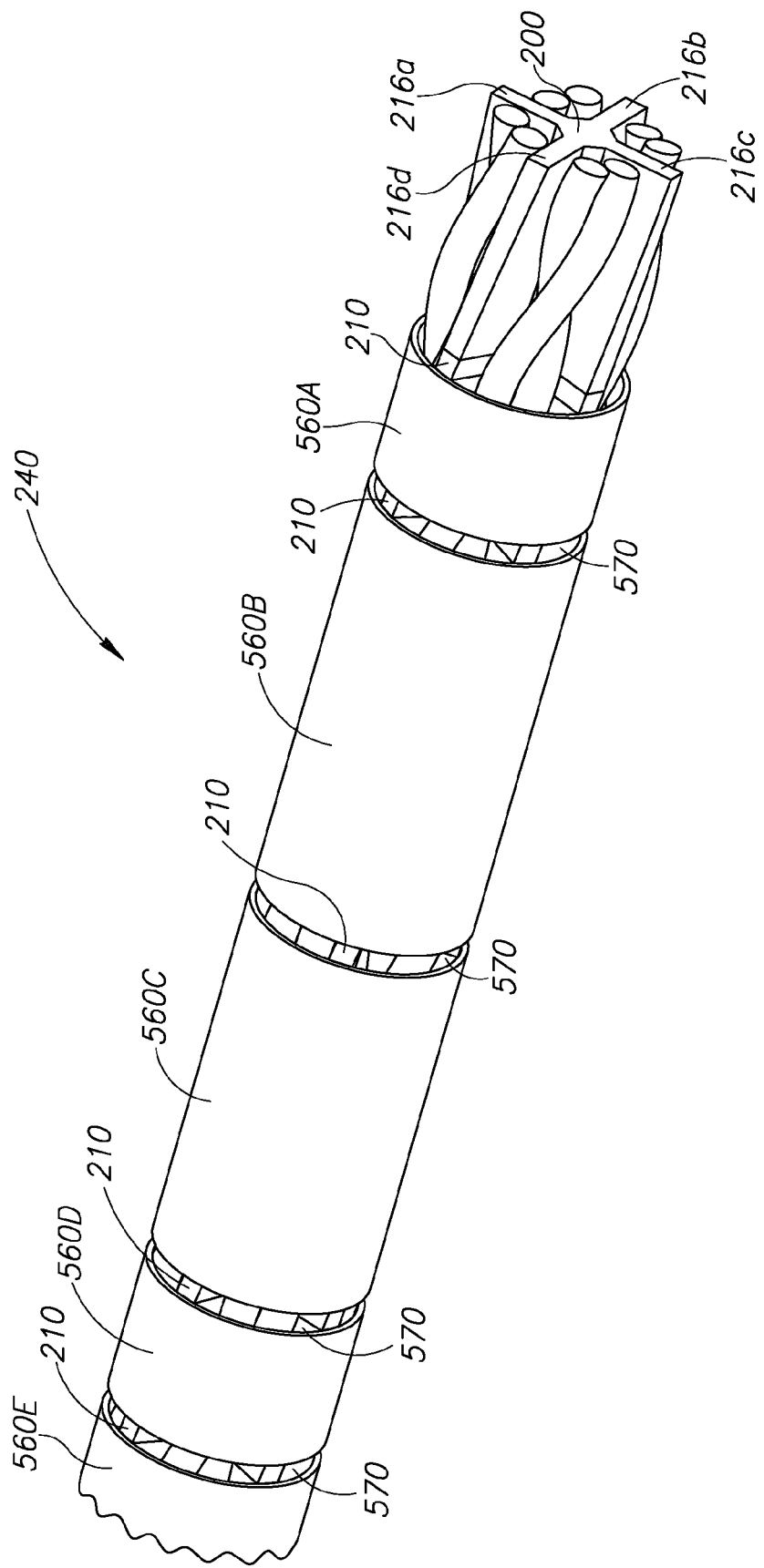
FIG. 23 is a perspective view of the communication cable of FIG. 20 incorporating yet another alternate implementation of the discontinuous conductive shield.
Figure 24:
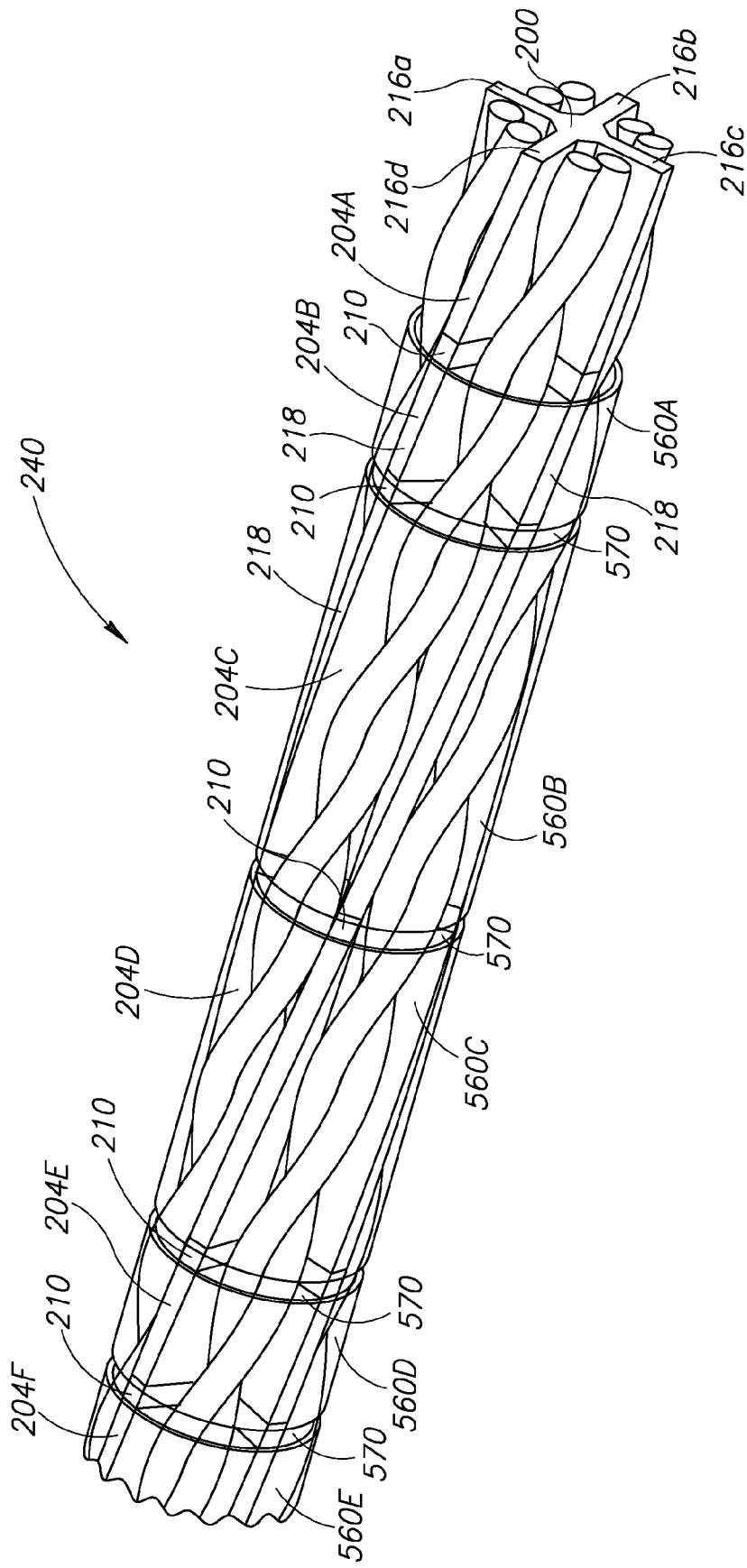
FIG. 24 is a perspective view of the communication cable of FIG. 23 in which the shield segments have been illustrated as transparent to provide a better view of components positioned inside the cable and under the shield segments.

Adjacent separator sections 204 are electrically separated longitudinally from each other by a nonconductive or insulating portion 210. For example, the separator section 204A is electrically isolated from the separator section 204B by an insulating portion 210, the separator section 204B is electrically isolated from the separator section 204C by an insulating portion 210, and so forth. By way of a non-limiting example, each of the insulating portions 210 may be implemented as a physical separation (such as an air gap, or a gap filled with a non-conductive filler or separating material). In FIGS. 14, 15, 20, and 21, the insulating portions 210 have been implemented as air gaps positioned between adjacent separator sections 204. In FIGS. 22-24, the insulating portions 210 have been implemented as sections of non-conductive material positioned between adjacent separator sections 204.

The insulating portions 210 each have a length "GL-a." In the embodiment illustrated, the length "GL-a" is the same for all of the insulating portions 210. However, this is not a requirement and different ones of the insulating portions 210 may different lengths. In particular embodiments, it may be desirable to minimize the length "GL-a" of the insulating portions 210 between adjacent separator sections 204. For example, adjacent separator sections 204 may overlap one another with an insulating portion 210 disposed therebetween in a manner similar to that of the construction of adjacent shield segments 560 of a discontinuous cable shield system 250 illustrated in FIG. 22 and discussed below.

Figure 16:
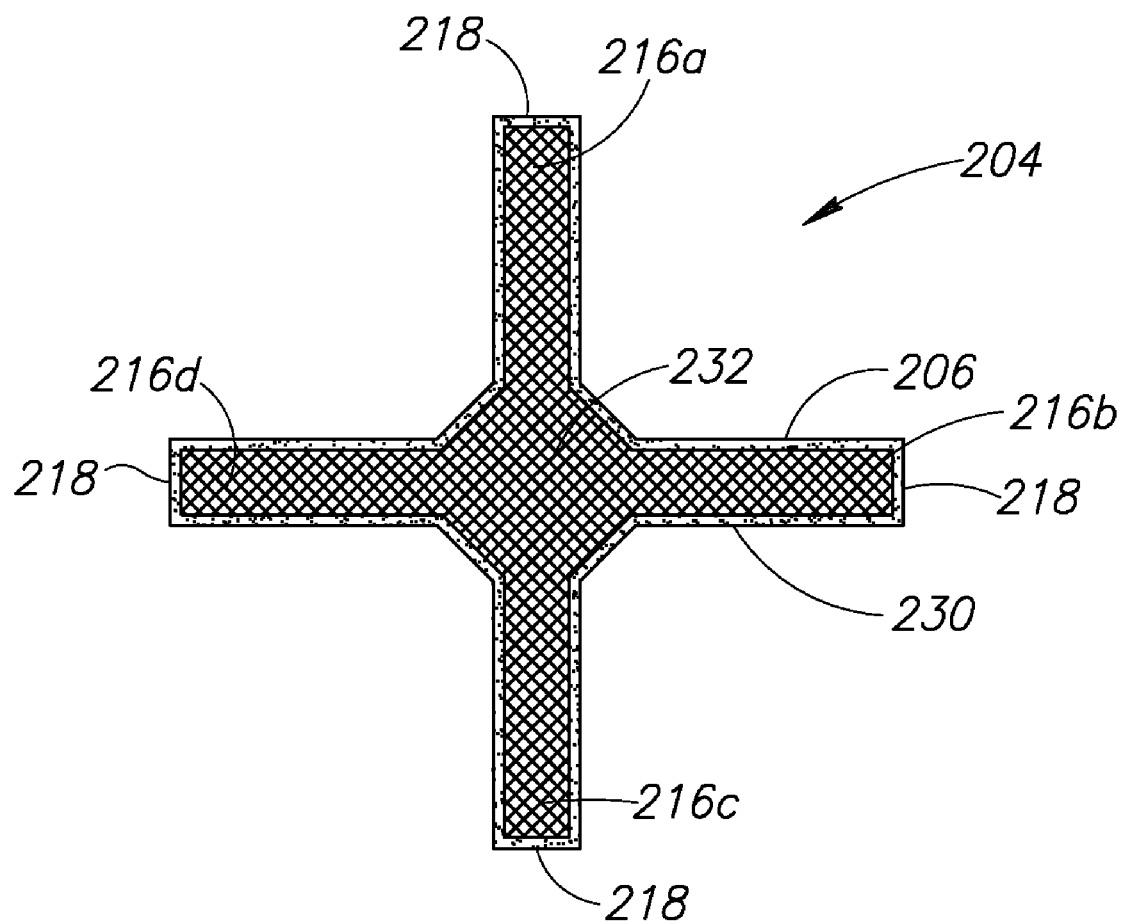
FIG. 16 is a cross-sectional view of one of the separator sections of the discontinuous shielding separator of FIG. 14.

A cross-sectional view through one of the separator sections 204 is provided in FIG. 16. As mentioned above, at least a portion of the outer surface 206 of the separator sections 204 is conductive. In the embodiment illustrated, the separator sections 204 include an outer conductive layer 230 that is disposed about an inner non-conductive substrate 232. The non-conductive substrate 232 may extend the entire length of the shielding separator 200 and non-conductively physically connect the separator sections 204 together. As is appreciated by those of ordinary skill in the art, the configuration of the conductive layer 230 about the inner non-conductive substrate 232 is provided as a non-limiting example of an implementation of the separator sections 204. Alternate configurations may also be used, such as an outer insulative and supportive exo-skin holding conductive core chunks separated by gaps filled with air or infiltrated plastic or a combination thereof, as well as an extruded implementation that includes injected conductive material followed by a non-conductive material with the option of a semi-swirly separation of conductive areas, or enhanced conductivity of a material otherwise having limited conductivity by selective plating with conductive material.

The shielding separator 200 may be constructed by selectively applying the outer conductive layer 230 to the non-conductive substrate 232 in selected regions to define the separator sections 204 with the insulating portions 210 (see FIGS. 14 and 15) therebetween. For example, sputtering, evaporation, or the like may be used to selectively apply a layer of conductive material (such as copper, aluminum, and the like) to the outer surface 206 of the separator sections 204. The non-conductive substrate 232 may be implemented as a typical prior art non-conducting cable spline or separator (not shown).

Because sputtering, evaporation, and the like produce results similar to those of a paint sprayer, the edges of the applied outer conductive layer 230 along the insulating portions 210 (see FIGS. 14 and 15) may be poorly defined. If necessary or desired, techniques such as stenciling, electrostatic redirection, and the like may be used to improve or more clearly define the edges of the applied outer conductive layer 230 along the insulating portions 210 (see FIGS. 14 and 15). Further, better defined edges may be achieved by using baffles, and other physical barriers to direct the applied outer conductive layer 230.

Figure 17:
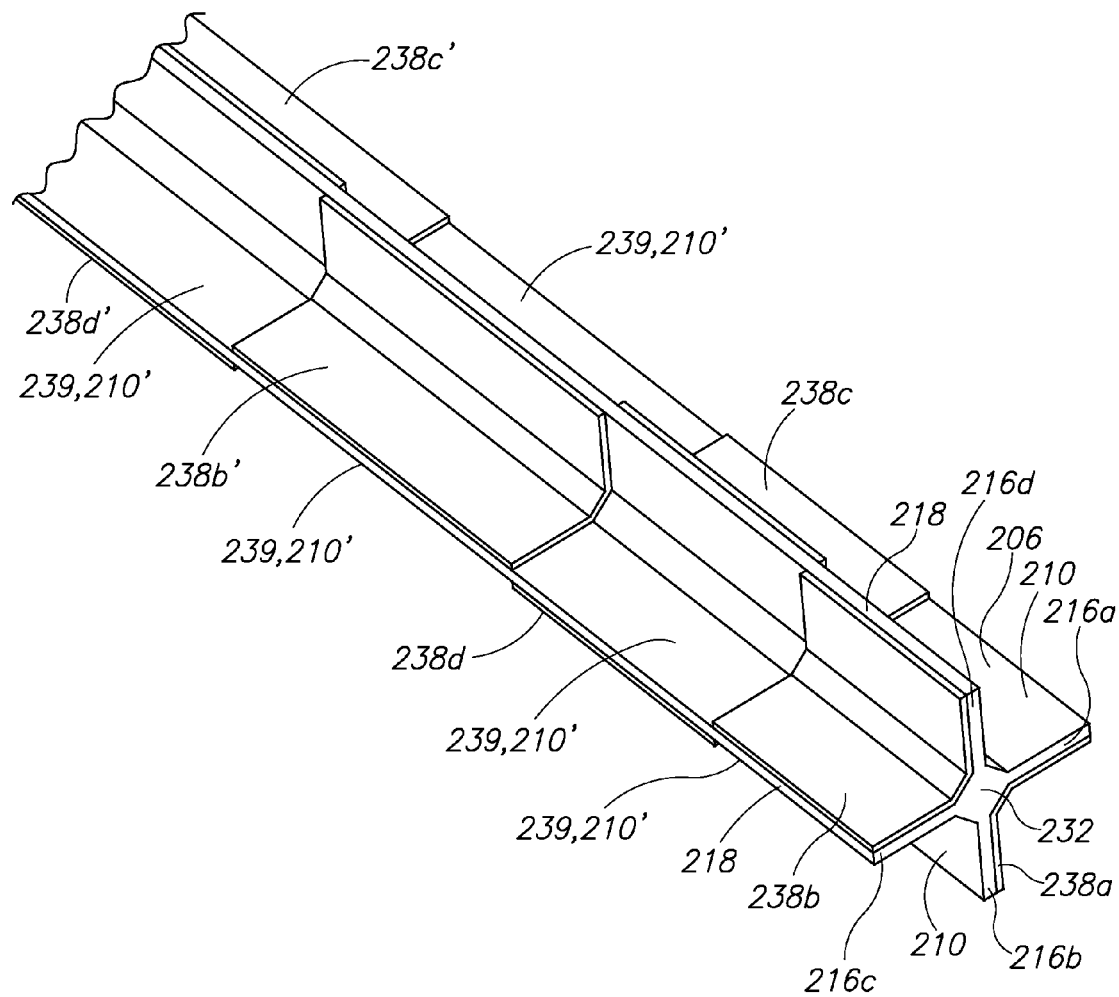
FIG. 17 is a perspective view of an alternate implementation of the discontinuous shielding separator of FIG. 14.

Referring to FIG. 17, by way of another example, lee side spray shadowing may be used. Using this technique, the non-conductive substrate 232 (which may be implemented as a typical prior art non-conducting cable spline or separator (not shown)) is suspended vertically and sprayed on only one side, leaving uncoated the "shadowed" side facing away from the direction of the spray. The non-conductive substrate 232 may be oriented relative to a first spray such that only a first portion of a first valley formed between adjacent elongated dividers 216a-216d is coated with conductive material to form a first conductive region 238a. For example, the first spray may coat a first portion of a first valley formed between dividers 216a-216b. At least one of the first spray and the substrate 232 are moved relative to one another to apply conductive material to a second portion of the first valley spaced longitudinally from the first portion of the first valley to form a second conductive region (not shown) in the first valley. This method leaves an uncoated portion (not shown) between the first conductive region 238a and the second conductive region (not shown) to form an insulating portion 210'. This process is then repeated along the first valley to form multiple spaced apart conductive regions.

A second spray opposing the first spray may be used to coat a first portion of a second valley opposite the first valley with conductive material to form a first conductive region 238b. Continuing the previous example, the second spray may coat a first portion of a second valley formed between dividers 216c-216d. At least one of the second spray and the substrate 232 are moved relative to one another to apply conductive material to a second portion of the second valley spaced longitudinally from the first portion of the second valley to form a second conductive region 238b' in the second valley. This method leaves an uncoated portion 239 between the first conductive region 238b and the second conductive region 238b' to form an insulating portion 210'. This process is then repeated along the second valley to form multiple spaced apart conductive regions.

Then, a third spray applies conductive material to only a first portion of a third valley to form a first conductive region 238c. Continuing the previous example, the third spray may coat a first portion of a third valley formed between dividers 216a-216d. At least one of the third spray and the substrate 232 are moved relative to one another to apply conductive material to a second portion of the third valley spaced longitudinally from the first portion of the third valley to form a second conductive region 238c' in the third valley. This method leaves an uncoated portion 239 between the first conductive region 238c and the second conductive region 238c' to form an insulating portion 210'. This process is then repeated along the third valley to form multiple spaced apart conductive regions.

Then, a fourth spray applies conductive material to only a first portion of a fourth valley to form a first conductive region 238d. Continuing the previous example, the fourth spray may coat a first portion of a fourth valley formed between dividers 216b-216c. At least one of the fourth spray and the substrate 232 are moved relative to one another to apply conductive material to a second portion of the fourth valley spaced longitudinally from the first portion of the fourth valley to form a second conductive region 238d' in the fourth valley. This method leaves an uncoated portion 239 between the first conductive region 238d and the second conductive region 238d' to form an insulating portion 210'. This process is then repeated along the fourth valley to form multiple spaced apart conductive regions.

The faces of the dividers 216a-216d coated by the first, second, third, and fourth sprays (and separated longitudinally by the uncoated insulating portions 210) provide the necessary shielding for the twisted pairs 104, 106, 108, and 110.

If the distal edge portions 218 of the dividers 216a-216d are coated with conductive material, the conductive regions in adjacent valleys may be spaced apart longitudinally to prevent electrical communication between a conductive region in one valley and a conductive region in another valley.

If the distal edge portions 218 of the dividers 216a-216d are left uncoated, the conductive regions in one of the valleys will be electrically isolated from the conductive regions in the other valleys. Therefore, in such embodiments, the conductive regions in any of the valleys may be applied without regard to the locations of the conductive regions in the other valleys. In this manner, the outer conductive layer 230 may include a discontinuous patchwork of conductive regions that are separated longitudinally from one another by the insulating portions 210 and laterally by the uncoated distal edge portions 218.

However, depending upon the implementation details, the lee side spray shadowing method may deposit conductive material on the distal edge portions 218 of the dividers 216a-216d rendering them conductive. This could cause electrically communication between laterally adjacent portions of the conductive regions of the outer conductive layer 230. To prevent this, abrasion, peeling, skiving, and the like may be used to remove the conductive material from the distal edge portions 218 of the dividers 216a-216d. For example, the non-conductive substrate 232 could be threaded through a sharp or abrasive "cutout" configured to remove conductive material on the distal edge portions 218 of the dividers 216a-216d exposing the non-conductive material underneath.

Poorly defined edges may result in overlap and/or underlap of the conductive regions of the outer conductive layer 230. This overlap and/or underlap may change the resonance character of the separator sections 204. However, this change in resonance character may be acceptable and in some cases, desirable. Nevertheless, stencils may be used to limit overlap and/or underlap of the conductive regions. If the substrate 232 is moved during the application of the outer conductive layer 230, one or more stencils may travel a short distance with the non-conductive substrate 232 as it moves along in a continuous fashion. Alternatively, the stencil(s) could remain stationary and the non-conductive substrate 232 stopped to apply the outer conductive layer 230. Baffles and barriers may be used to control or limit turbulence that may cause unwanted overspray.

Figure 18:
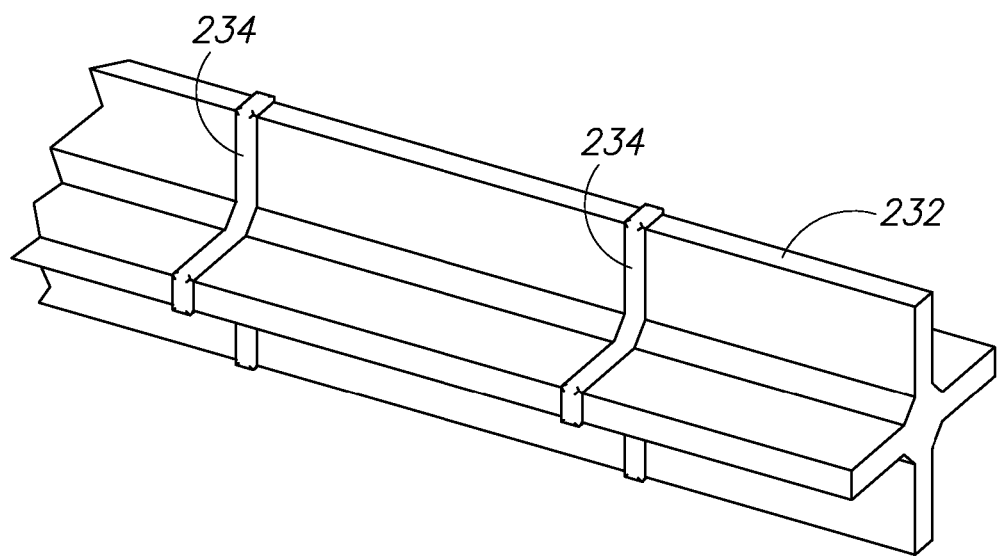
FIG. 18 is a perspective view of a non-conductive substrate having protrusions that may be used to construct the discontinuous shielding separator depicted in FIGS. 22-24.

Returning to FIG. 16, the outer conductive layer 230 may be applied to substantially all of the outer surface of the non-conductive substrate 232. Then, selected portions of the outer conductive layer 230 removed from the non-conductive substrate 232 to define the insulating portions 210 (see FIGS. 14 and 15) between the separator sections 204. For example, referring to FIG. 18, the non-conductive substrate 232 may be constructed to include protrusions 234 (e.g., embossed portions, ridges, hiccups, etc.). In such embodiments, the non-conductive substrate 232 may be formed by an extrusion process and the protrusions 234 formed by an extruder. After the outer conductive layer 230 is applied to the non-conductive substrate 232, the protrusions 234 may be cut away from the non-conductive substrate 232 thereby removing portions of the outer conductive layer 230 applied thereto. In the areas where the protrusions 234 had been, the insulating portions 210 (see FIGS. 14 and 15) are formed between adjacent separator sections 204 (see FIGS. 14 and 15).

The outer conductive layer 230 (see FIG. 16) may be applied to the non-conductive substrate 232 in isolated regions electrically separated from one another along the non-conductive substrate 232. For example, the outer conductive layer 230 may be applied to the non-conductive substrate 232 as a plurality of isolated conductive particles (not shown). By way of a non-limiting example, such particles may be applied to the non-conductive substrate 232 using a spray technique. No matter how applied, the isolated regions may be physically separated from one another along the non-conductive substrate 232 by non-uniform distances to render them aperiodic or substantially aperiodic with the periodic structures (e.g., the wires 104a, 104b, 106a, 106b, 108a, 108b, 110a, and 110b of the twisted pairs 104, 106, 108, and 110, and the bundle) of the cable.

Returning to FIG. 16, the outer conductive layer 230 may also be formed using conductive foil (not shown). For example, "stamp-and-place" equipment (not shown) may be used to attach the conductive foil to the non-conductive substrate 232. The conductive foil may be glued to the non-conductive substrate 232 with an adhesive. Deformation of the non-conductive substrate 232 during application of the conductive foil may be beneficial and could aid with positioning the conductive foil relative to the non-conductive substrate 232 and may help avoid tearing. The conductive foil could be applied in any of the locations discussed above where conductive regions may be applied using lee side spray shadowing. Further, the conductive foil may cover the entire outer surface of the non-conductive substrate 232 of each of the separator sections 204, which are separated longitudinally by insulating portions 210 not covered by conductive foil The conductive foil may be cut into a predetermined number of lengths (e.g., 3, 5, 7, etc.) before being applied to the non-conductive substrate 232. For example, three different foil lengths may be chosen that are configured to introduce adequate chaos into the overall collection of "preferred resonances" within the cable 150 (see FIG. 14) to approximate true randomness (or aperiodicity). A "cigarette wrap" foil wrap cable construction technique may be used to apply the conductive foil. Using this technique, a segmented foil-on-nonconductive backing film is produced by feeding a continuous strip of foil onto a segmented cutting wheel. The wheel has a number articulated sectors (e.g., 3, 4, 5, etc.) configured to sever the foil into sections that are subsequently laminated onto a nonconductive backing film.

Alternatively, the conductive foil may be form into a predetermined number of lengths with a roller-feed system in a linear fashion. Using this method, by controlling the speed of the rollers, the conductive foil may be selectively torn at a predetermined length in a controlled tearing operation. This method may be enhanced with the use of cutting blades, tear precipitating lances, and the like. If a tear is somewhat irregular, an adequate non-conductive gap (i.e., an insulating portion 210) will still tend to form between the adjacent torn sections of conductive foil because the tear formed between a trailing edge of a first foil section and a leading edge of the next conductive foil section. This irregularity may also help introduce additional randomness (or aperiodicity) into the cable 150 (see FIG. 14).

Figure 19:
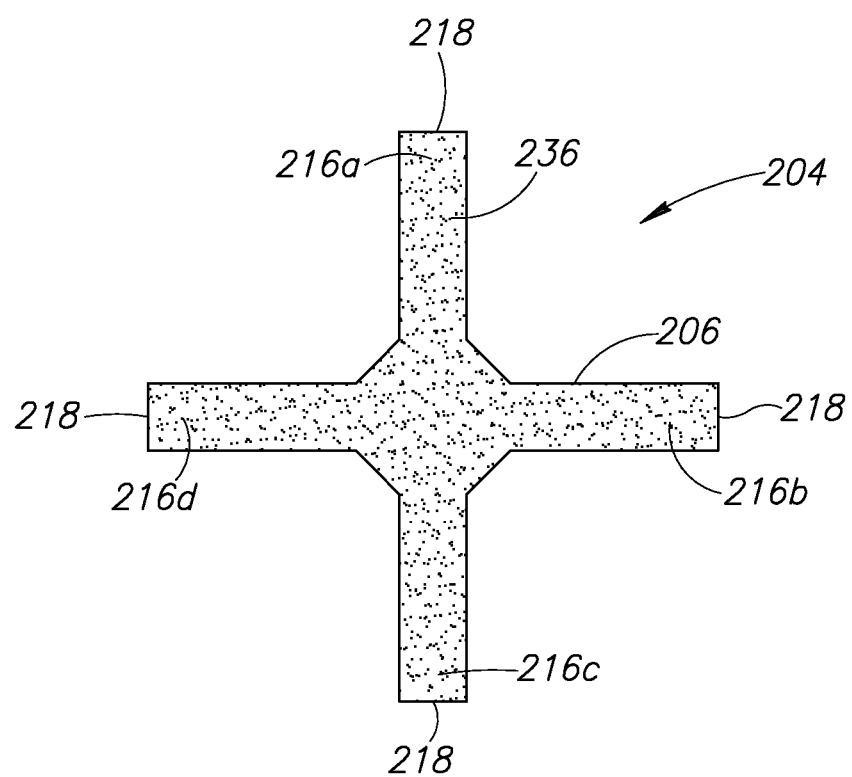
FIG. 19 is a cross-sectional view of an alternate implementation of a separator section of the discontinuous shielding separator of FIG. 14.

An alternate cross-sectional view through an alternate embodiment of one of the separator sections 204 is provided in FIG. 19. In this embodiment, the separator sections 204 are constructed from a conductive substrate 236. As illustrated in FIGS. 22-24, a non-conductive material may be used to form insulating portions 210 disposed between adjacent separator sections 204.

In yet another embodiment (not shown), the separator sections 204 may be constructed by molding or otherwise forming the non-conductive substrate 232 with discrete conductive regions (not shown) disposed therein. The discrete conductive regions are electrically separated from one another by portions of the conductive substrate 236. In such embodiments, some of the discrete conductive regions may be positioned completely inside the conductive substrate 236, some of the discrete conductive regions may be positioned completely along the outer surface of the conductive substrate 236, and some of the discrete conductive regions may be positioned partially inside the conductive substrate 236 and partially along the outer surface of the conductive substrate 236. Nevertheless, the discrete conductive regions may be physically separated from one another in the non-conductive substrate 232 by non-uniform distances thereby rendering them aperiodic or substantially aperiodic with respect to the periodic structures (e.g., the wires 104a, 104b, 106a, 106b, 108a, 108b, 110a, and 110b of the twisted pairs 104, 106, 108, and 110, and the bundle) of the cable.

Figure 20:
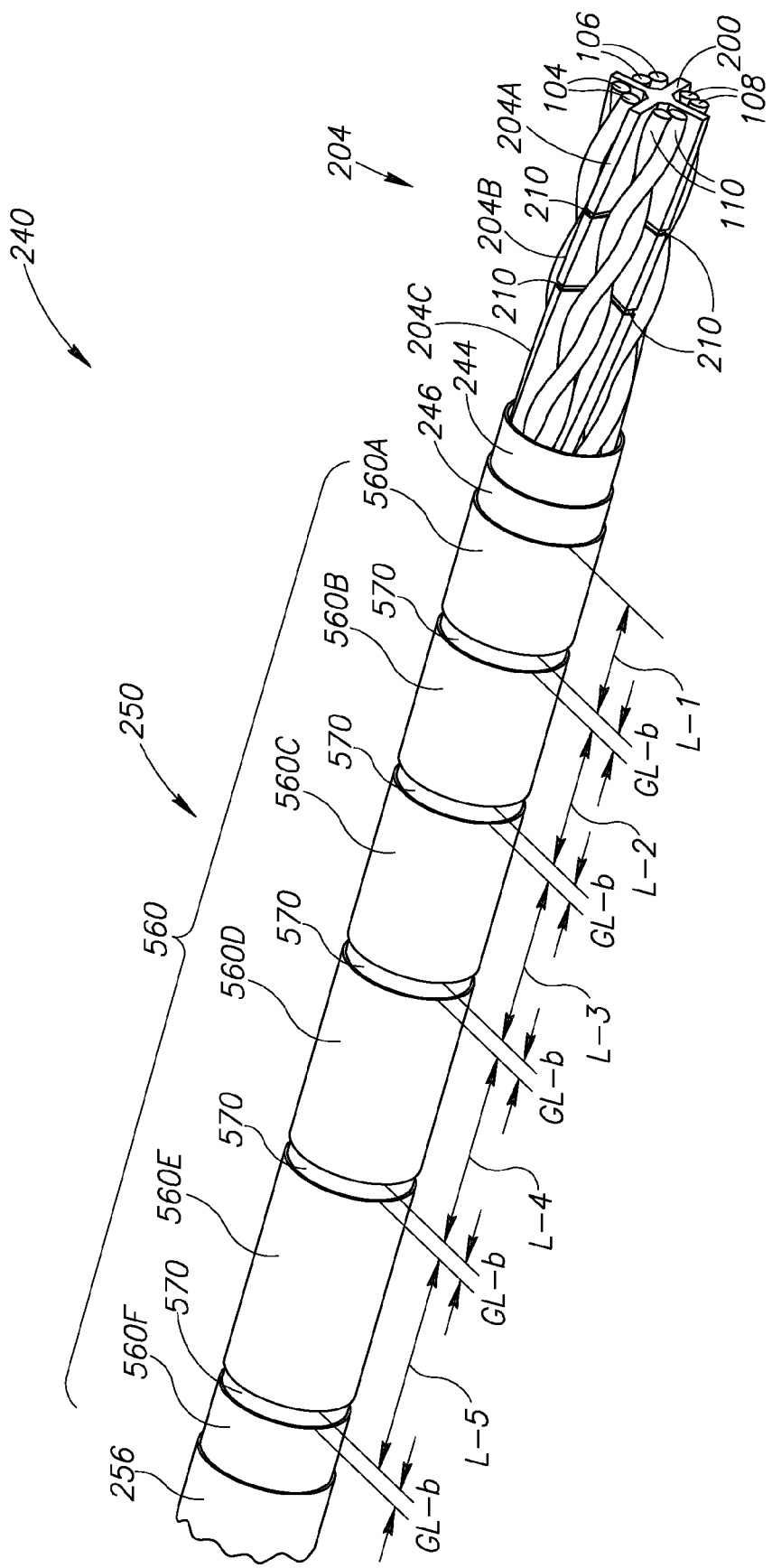
FIG. 20 is a perspective view of a communication cable incorporating the discontinuous shielding separator of FIG. 14 and a discontinuous conductive shield having a series of shield segments.

FIG. 20 illustrates a first embodiment of a cable 240 incorporating the shielding separator 200 located between the twisted pairs 104, 106, 108, and 110. The shielding separator 200 and the twisted pairs 104, 106, 108, and 110 are surrounded by an inner cable sheath 244 and covered by insulation 246 (such as a Mylar layer). The inner cable sheath 244 may be substantially similar to the internal sheath 12 (see FIG. 1) and the insulation 246 may be substantially similar to the insulation 14 (see FIG. 1). The insulation 246 is at least partially covered by a discontinuous cable shield system 250. An outer cable jacket or sheath 256 covers the discontinuous cable shield system 250. The outer cable sheath 256 may be substantially similar to the external sheath 22 (see FIG. 1). However, the cable 240 does not include the drain wire 18 included in the prior art cable 100 illustrated in FIG. 1.

By way of non-limiting examples, the discontinuous cable shield system 250 may be implemented using any of the discontinuous cable shield systems disclosed in U.S. Pat. No. 7,332,676, filed on Mar. 28, 2006, which is incorporated herein by reference in its entirety. The discontinuous cable shield system 250 includes a series of shield segments 560 electrically separated from one another by non-conductive segmentation portions 570 (e.g., air gaps) located between adjacent shield segments. In some embodiments, the outer cable sheath 256 may cover portions of the insulation 246 exposed by the segmentation portions 570. At least a portion of each of the shield segments 560 is constructed from a conductive material. In the embodiments illustrated, each of the shield segments 560 is implemented as a conductive sleeve.

FIG. 20 illustrates six linearly arranged shield segments 560A to 560F, each in electrical isolation from the other shield segments of the discontinuous cable shield system 250. The shield segments 560A to 560F are constructed using a predetermined number of lengths. In the embodiment illustrated, five different lengths have been used. The shield segment 560A has a first length "L-1," the shield segment 560B has a second length "L-2," the shield segment 560C has a third length "L-3," the shield segment 560D has a fourth length "L-4," and the shield segment 560E has a fifth length "SL-5." The shield segment 560F has one of the lengths "L-1" to "L-5."

As explained above, it is desirable to avoid particular periodic relationships (referred to as "coincidences") between the various components, which include the twisted pairs 104, 106, 108, and 110, the separator sections 204, and the shield segments 560. Thus, inside the cable 240, the desired relationship between the components has been described as being aperiodic. The shield segments 560 may be constructed to each have a length selected from a predetermined number of segment lengths. Further, the shield segments 560 may be arranged along the twisted wire pairs 104, 106, 108, and 110 such that the shield segments 560 are substantially aperiodic with the twist rates of the twisted wire pairs and the bundle 152.

In the cable 240, the shield segments 560 are electrically isolated from the separator sections 204 by the inner cable sheath 244 and the insulation 246. Because the separator sections 204 and the shield segments 560 are arranged along the length of the cable 240 in an aperiodic arrangement, neither induces a significant amount of signal in the other. However, because each of the separator sections 204 and the shield segments 560 has conductive portions, to avoid electrical communication therebetween, the separator sections 204 are insulated from the shield segments 560.

The electrically separated shield segments 560 serve as an incomplete, patch-work, discontinuous, "granulated," or otherwise perforated shield that may be effective at reducing crosstalk when applied within a near-field zone around differential transmission lines such as the twisted pairs 104, 106, 108, and 110. This shield "granulation" may provide improved safety over a long-continuous un-grounded conventional shield because the separated shield segments 560 may block a fault emanating from a distance along the cable.

In the embodiment of the cable 240 illustrated in FIG. 20, each of the segmentation portions 570 are implemented as air-filled gaps having a substantially equal or constant longitudinal length "GL-b." Thus, in the embodiment illustrated, the length "GL-b" is the same for all of the segmentation portions 570. However, this is not a requirement and different ones of the segmentation portions 570 may different lengths. In particular embodiments, it may be desirable to minimize the length "GL-b" of the segmentation portions 570 between adjacent shield segments 560.

Figure 21:
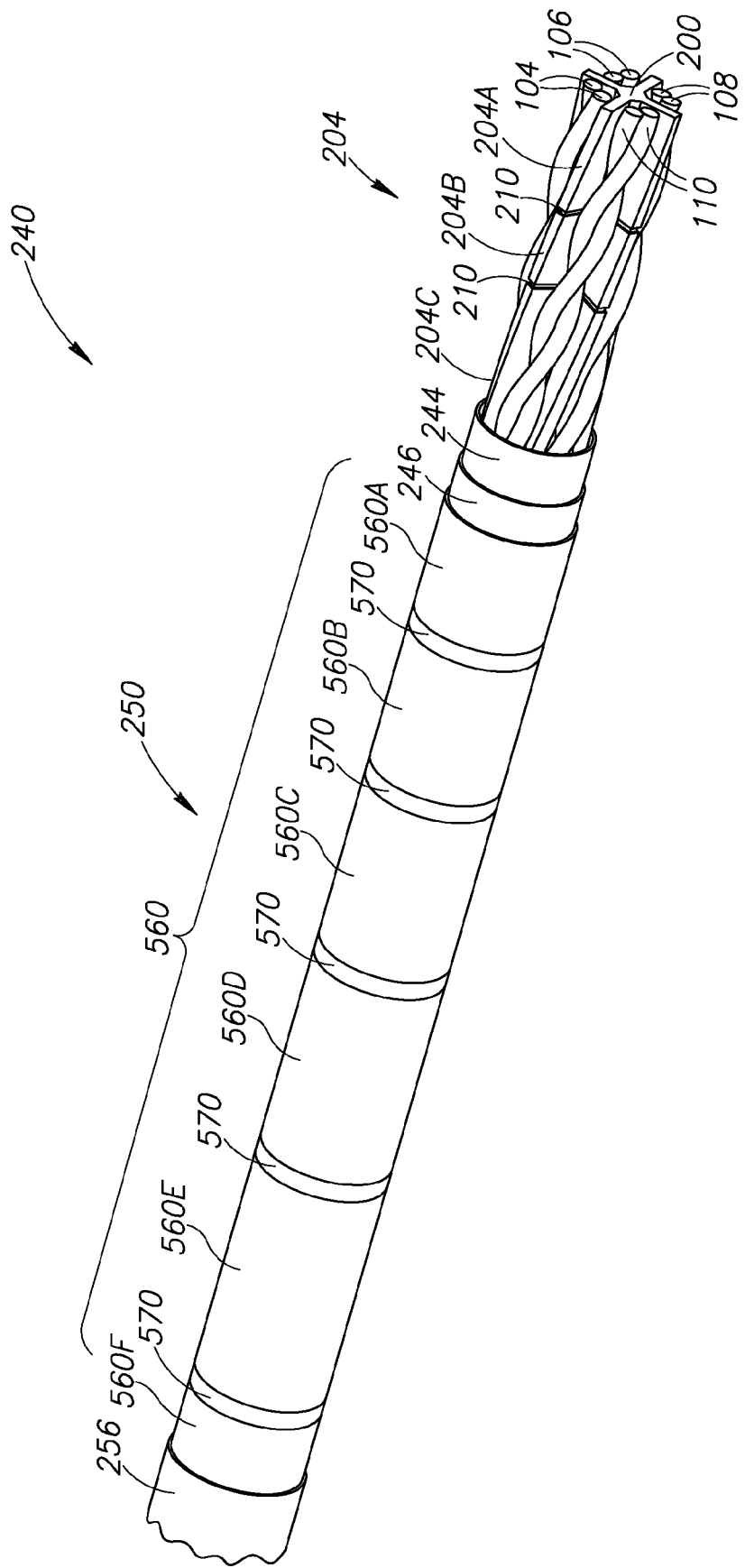
FIG. 21 is a perspective view of the communication cable of FIG. 20 incorporating an alternate implementation of the discontinuous conductive shield.

In the embodiment of the cable 240 illustrated in FIG. 21, each of the segmentation portions 570 are implemented as segments of non-conductive material having a substantially equal or constant longitudinal length interposed between adjacent shield segments 560 to separate them electrically.

While the segmentation portions 570 in FIGS. 20 and 21 have been described as having substantially equal or constant longitudinal lengths "GL-b," this is not a requirement and segmentation portions 570 having different lengths may be used to separate adjacent shield segments 560.

In the embodiment of the cable 240 illustrated in FIG. 22, adjacent shield segments 560 overlap with a segmentation portion 570 concentrically disposed therebetween to electrically separate the adjacent shield segments 560 from one another. In such embodiments, the segmentation portions 570 may be implemented as a layer 572 of non-conductive material.

FIGS. 23 and 24 illustrate another alternate embodiment of the cable 240. In FIGS. 23 and 24, the separator sections 204 are registered with the shield segments 560 and each of the separator sections 204 is coupled to one of the shield segments 560. In this configuration, the segmentation portions 570 are coincident and aligned with the insulating portions 210. While the segmentation portions 570 have been illustrated as air-gaps and the insulating portions 210 as sections of non-conductive material, those of ordinary skill in the art appreciate that the segmentation portions 570 may be implemented in any of ways discussed above including as regions of non-conductive material and the insulating portions 210 may be implemented in any of ways discussed above including as air-gaps.

In FIGS. 23 and 24, each of the separator sections 204 is coupled to a corresponding one of the shield segments 560 along its distal end portions 218. Thus, each of the separator sections 204 is in electrical communication with a corresponding one of the shield segments 560. As is apparent to those of ordinary skill in the art, in FIGS. 23 and 24, each of the separator sections 204 is illustrated as having approximately the same length as its corresponding shield segment 560. For example, the separator section 204B has the same length as the shield segment 560A. However, if the separator sections 204B overlap (as illustrated in FIG. 22), the length of each of the separator sections 204 may be less than the length of its corresponding shield segment 560. Alternatively, in embodiments in which the segmentation portions 570 are longer than the insulating portions 210, the length of each of the separator sections 204 may be greater than the length of its corresponding shield segment 560. The shielding separator 200 and the discontinuous cable shield system 250 may be formed together as a single unit. For example, the shielding separator 200 and the discontinuous cable shield system 250 may be extruded as a single unit.

Method of Determining Separator Sections Lengths

Figure 25:
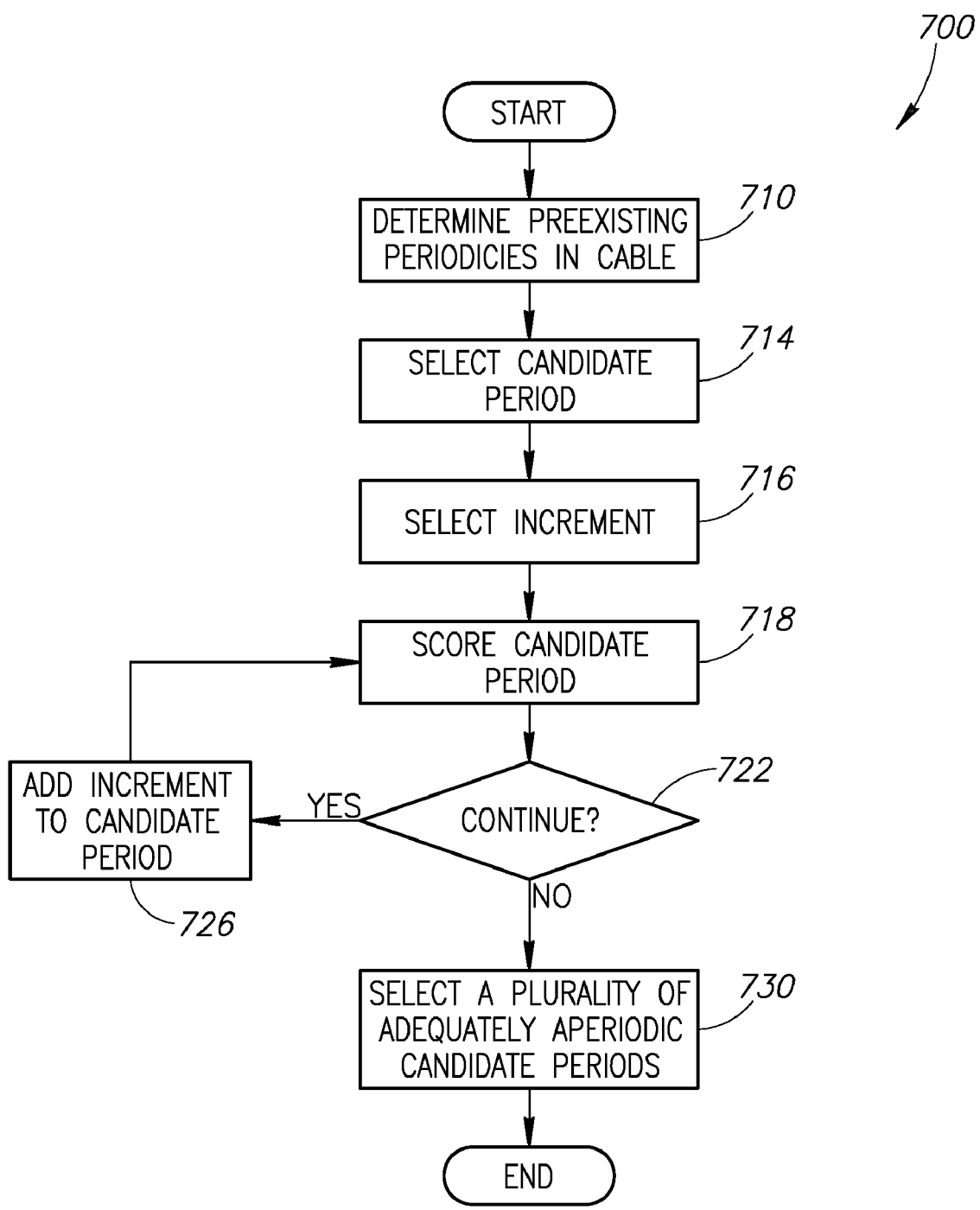
FIG. 25 is a flow diagram illustrating a method of determining a predetermined number of section lengths for constructing the sections of the discontinuous shielding separator of FIG. 14.

FIG. 25 provides a method 700 of determining the predetermined number of lengths used to construct the separator sections 204 (see FIG. 15). As is apparent to those of ordinary skill in the art, the method 700 may also be used to determine a predetermined number of lengths used to construct the shield segments 560 of the discontinuous cable shield system 250 (see FIG. 14).

In a first block 710, preexisting periodicities in the cable structure are determined. For example, in block 710, the twist rates of the bundle 152 and the twisted pairs 104, 106, 108, and 110 are determined.

In next block 714, a candidate period for the separator sections 204 is selected. The candidate period is a sum of a gap width and a candidate length of the separator sections 204. The candidate length corresponds to a conductive length of the separator sections 204. Referring to FIG. 15, the gap width is the length "GL-a" of the insulating portions 210. The first candidate period may be a starting or minimum candidate period. This value may be selected by first selecting a minimum percentage of conductive adjacency (e.g., 98%), which is a ratio of the conductive length of the separator sections 204 to a sum of the conductive length of the separator sections 204 and the gap length "GL-a." Thus, if the gap width is about 0.05 inches and the conductive adjacency is at least 98%, the candidate period must be at least about 2.5 inches long ((2.5−0.05)/12.5=0.98). As is appreciated by those of ordinary skill in the art, other values could be used for both the gap width and the minimum percentage of conductive adjacency. It may be desirable to use a small gap width. However, practical limitations, such as manufacturing capabilities, may determine the gap width, at least in part.

In block 716, an increment amount is selected. Those of ordinary skill in the art appreciate requisite care may be used in selecting the increment amount, including empirical testing of the communication cable, to help ensure discovery of all or an adequate number of useful and/or optimal lengths for constructing the separator sections 204.

Then, in block 718, the candidate period is evaluated and scored based on its aperiodicity with the preexisting periodic structures of the cable 240 (see FIG. 20). For example, referring to FIG. 20, using a candidate length of 4.2 inches, an insulating portion 210 occurs every 4.2 inches so the first separator section 204 extends from zero to just before 4.2 inches, every 12th twist of the twisted (blue) pair 104 (twist length=0.35 inches) will be alongside an insulating portion 210. This means, approximately 12 twists would be periodically adjacent every candidate period (i.e., along every separator section 204 and one of its adjacent insulating portions 210). The 12 twists approximate the 12th harmonic of the separator sections 204 and would likely induce a significant amount of signal in each separator section 204, which would be undesirable, particularly if in-band. Similarly, approximately 10.99 twists of the twisted (green) pair 108 are adjacent each of the separator sections 204. Again, this is undesirable.

Table A below provides a non-limiting example of how each candidate period may be scored. In Table A, a candidate period of 4.2 inches has been used for illustrative purposes.

TABLE A

|  | Length Inches | m = 1 | m = 2 | m = 3 | Overall Score |
|---|---|---|---|---|---|
| Candidate Period | 4.2 |  |  |  |  |
| Bundle | 5.0000 | 0.5633 | 0.9308 | 0.9750 |  |
| first (blue) pair | 0.3500 | 0.0003 | 0.0007 | 0.0010 |  |
| second (orange) pair | 0.4252 | 0.3743 | 0.6942 | 0.9132 |  |
| third (green) pair | 0.3819 | 0.0062 | 0.0123 | 0.0185 |  |
| fourth (brown) pair | 0.4750 | 0.4757 | 0.8369 | 0.9965 |  |
| bundle score |  | 0.5633 | 0.9308 | 0.9750 | 0.5633 |
| aggregate twisted pair score |  | 0.0003 | 0.0007 | 0.0010 | 0.0003 |
| overall score |  | 0.0020 | 0.0065 | 0.0102 | 0.0020 |

The following is one non-limiting method of evaluating periodicity with the other structures. For each preexisting periodic structure, which is longer, the preexisting periodic structure or the candidate period is determined. Then, the longer of the preexisting periodic structure and the candidate period is divided by the shorter of the two values. The result will have an integer portion and a decimal portion (which may be zero). The decimal portion represents an amount by which the preexisting periodic structure and the candidate period are aperiodic. In other words, the closer the decimal portion is to zero or one, the closer the preexisting periodic structure and the candidate period are to being periodic with one another.

Next, each of the decimal portions is weighted so that values nearer 0.5 are given greater weight than decimal portions nearer to zero or one. For example, a positive half of a sine function may be used as a weighting function. In such an embodiment, the decimal portions are weighted by calculating the sine of the decimal portions multiplied by $\pi$ (pi). By way of a non-limiting example, a separate score may be calculated for the twist rate of the bundle 152 and an aggregate score may be calculated for the twist rates of the twisted pairs 104, 106, 108, and 110. The score for the twist rate of the bundle may simply be its weighted decimal portion calculated above. The aggregate score for the twist rates of the twisted pairs 104, 106, 108, and 110 may be the minimum of the weighted decimal portions calculated above for the twist rates of the twisted pairs 104, 106, 108, and 110.

Optionally, multiples of the periods of the preexisting periodic structures of the cable may be considered. In such an embodiment, the twist rates of the bundle 152 and the twisted pairs 104, 106, 108, and 110 are multiplied by a scalar, such as two, three, four, five, etc. In the previously discussed analysis, the results obtained are those obtained when the scalar used is one. By multiplying the periods of the preexisting periodic structures by a scalar greater than one, the periods are increased. For each multiple and each preexisting periodic structure, the longer of the increased period of the preexisting periodic structure and the candidate period is divided by the shorter of the two values. Next, each of the decimal portions of the results is weighted so that values nearer 0.5 are given greater weight than decimal portions nearer to zero or one. Again, the positive half of the sine function may be used as a weighting function. The score for the twist rate of the bundle may then be a minimum weighted decimal portion for all of the multiples for the bundle. The aggregate score for the twist rates of the twisted pairs 104, 106, 108, and 110 may be the minimum of the weighted decimal portions calculated above for all of the multiples for all of the twist rates of the twisted pairs 104, 106, 108, and 110.

Then, an overall score for the candidate period is determined. By way of a non-limiting example, the overall score may be calculated by multiplying the score for the bundle and the aggregate score for the twist rates of the twisted pairs 104, 106, 108, and 110 together. Optionally, the overall score may be scaled. For example, the overall score may be multiplied by 10. Using this exemplary scoring method, the candidate periods with the largest overall score will be the most aperiodic with the preexisting periodic structures of the cable.

Returning to FIG. 25, in decision block 722, whether to continue evaluating candidate periods is determined. The decision in decision block 722 is "YES" when a sufficient number of candidate periods have been evaluated to yield a sufficient number of lengths for constructing the separator sections 204. Whether a sufficient number of lengths for constructing the separator sections 204 have been identified may be determined based on empirical testing of cable performance. A sufficient number may be determined to have been identified when adding additional lengths provides an insignificant reduction in crosstalk in the cable (i.e., diminishing returns have been achieved).

If the decision in decision block 722 is "YES," in block 726, the increment amount determined in block 716 is added to candidate period and the method returns to block 718 to score the new candidate period. If the decision in decision block 722 is "NO," the method 700 advances to block 730. When block 730 is reached, the overall scores of more than one candidate period may have been evaluated.

Table B below illustrates the overall scores for several candidate periods, including the candidate period of 4.2 inches. In Table B, an increment amount of 0.005 inches was used. The smallest candidate period evaluated in Table B was about 2.72 inches and the largest candidate period evaluated was about 4.2 inches. Because of the large number of candidate periods occurring between 2.72 inches and 4.2 inches when an increment of 0.005 inches is used, for illustrative purposes, some of the data has been omitted from Table B. Empty rows have been inserted into Table B to illustrate where data has been omitted.

TABLE B

| Segment Length | Bundle Score | Twisted Pair Score | Overall Score |
|---|---|---|---|
| 2.7200 | 0.4866 | 0.3754 | 1.8266 |
| 2.7250 | 0.4958 | 0.4132 | 2.0487 |
| 2.7300 | 0.5050 | 0.4503 | 2.2738 |
| 2.7350 | 0.5140 | 0.4125 | 2.1204 |
| 2.8950 | 0.5394 | 0.2933 | 1.5820 |
| 2.9000 | 0.5155 | 0.3248 | 1.6742 |
| 2.9050 | 0.4913 | 0.3088 | 1.5172 |
| 2.9100 | 0.4669 | 0.1783 | 0.8325 |
| 3.2100 | 0.3542 | 0.3059 | 1.0836 |
| 3.2150 | 0.3399 | 0.3754 | 1.2760 |

TABLE B-continued

| Segment Length | Bundle Score | Twisted Pair Score | Overall Score |
|---|---|---|---|
| 3.2200 | 0.3256 | 0.4155 | 1.3531 |
| 3.2250 | 0.3113 | 0.3394 | 1.0565 |
| 3.5800 | 0.5619 | 0.2297 | 1.2908 |
| 3.5850 | 0.5466 | 0.2936 | 1.6046 |
| 3.5900 | 0.5312 | 0.3493 | 1.8554 |
| 3.5950 | 0.5156 | 0.2792 | 1.4395 |
| 3.9100 | 0.4919 | 0.5131 | 2.5244 |
| 3.9150 | 0.5053 | 0.5511 | 2.7848 |
| 3.9200 | 0.5185 | 0.5880 | 3.0488 |
| 3.9250 | 0.5315 | 0.4988 | 2.6514 |
| 4.2000 | 0.5633 | 0.0003 | 0.0020 |

In block 730, the overall scores for the candidate periods are evaluated to locate one or more candidate periods adequately aperiodic for the separator sections 204 (see FIG. 15). By way of a non-limiting example, a predetermined number of the candidate periods having the highest overall scores are selected. For example, the five candidate periods having the highest overall scores may be selected. However, it may be beneficial to select candidate periods that do not interfere with the operating frequencies of the cable 240.

For example, CAT 7A operates at frequencies at or below about 1000 MHz, CAT 7 operates at frequencies at or below about 600 MHz, CAT 6A operates at frequencies at or below about 500 MHz, and CAT 6 operates at frequencies at or below about 250 MHz. Thus, candidate periods that resonate at about 800 MHz should not be used for CAT 7A but may be used for CAT 7. For example, depending upon the implementation details, candidate periods greater than about 2.1 inches may resonate at or below about 1000 MHz and may therefore be unsuitable for use in a cable configured for the CAT 7A standard. Depending upon the implementation details, candidate periods greater than about 3.5 inches may resonate at or below about 600 MHz and may therefore be unsuitable for use in a cable configured for the CAT 7 standard. Depending upon the implementation details, candidate periods greater than about 4.2 inches may resonate at or below about 500 MHz and may therefore be unsuitable for use in a cable configured for the CAT 6A standard. Depending upon the implementation details, candidate periods greater than about 8.3 inches may resonate at or below about 250 MHz and may therefore be unsuitable for use in a cable configured for the CAT 6 standard. Thus, candidate periods between 3.5 inches and 4.1 inches may be suitable for cables constructed according to the CAT 6A and CAT 6 standards but not cables constructed in accordance with the CAT 7 and CAT 7A standards.

It may also be beneficial to select candidate periods that do not resonate at the same frequency or frequencies as one or more of the other segment lengths. For example, Table C below lists the resonant frequencies and first nine harmonics (i.e., the second harmonic to the tenth harmonic) for five selected candidate periods:

TABLE C

| Selected Candidate periods | Candidate Length (period – gap) | Resonant (MHz) | $2^{nd}$ MHz | $3^{rd}$ MHz | $4^{th}$ MHz | $5^{th}$ MHz | $6^{th}$ MHz | $7^{th}$ MHz | $8^{th}$ MHz | $9^{th}$ MHz | $10^{th}$ MHz |
|---|---|---|---|---|---|---|---|---|---|---|---|
| 2.73 | 2.68 | 786 | 1572 | 2358 | 3144 | 3930 | 4715 | 5501 | 6287 | 7073 | 7859 |
| 2.90 | 2.85 | 738 | 1476 | 2215 | 2953 | 3691 | 4429 | 5167 | 5906 | 6644 | 7382 |
| 3.22 | 3.17 | 662 | 1325 | 1987 | 2650 | 3312 | 3975 | 4637 | 5300 | 5962 | 6625 |
| 3.59 | 3.54 | 592 | 1184 | 1777 | 2369 | 2961 | 3553 | 4146 | 4738 | 5330 | 5922 |
| 3.92 | 3.87 | 541 | 1082 | 1623 | 2164 | 2705 | 3246 | 3788 | 4329 | 4870 | 5411 |

As discussed above, the candidate periods in Table C should be satisfactory for use with CAT 6 and 6A. Generally speaking, if the 9th harmonic of one of the separator sections 204 were to resonate with the 10th harmonic of another separator section 204, it would be less of a concern than if the fundamental resonance of one of the separator sections 204 were to resonate with the second harmonic of another separator section 204. For each candidate period, the strength of resonance may be estimated by dividing the candidate frequency of the longest candidate period by the resonance frequency of each of the other candidate periods and multiplying the results by the inverse of the harmonic number. The estimated strength of resonance values may be used to exclude candidate periods that would result in too much coincident resonance. The following table illustrates the estimated strengths of resonance values calculated for the frequencies in Table C above.

TABLE D

| Selected Candidate periods | Candidate Length (period – gap) | Resonant (MHz) | $2^{nd}$ MHz | $3^{rd}$ MHz | $4^{th}$ MHz | $5^{th}$ MHz | $6^{th}$ MHz | $7^{th}$ MHz | $8^{th}$ MHz | $9^{th}$ MHz | $10^{th}$ MHz |
|---|---|---|---|---|---|---|---|---|---|---|---|
| 2.73 | 2.68 | 69% | 34% | 23% | 17% | 14% | 11% | 10% | 9% | 8% | 7% |
| 2.90 | 2.85 | 73% | 37% | 24% | 18% | 15% | 12% | 10% | 9% | 8% | 7% |
| 3.22 | 3.17 | 82% | 41% | 27% | 20% | 16% | 14% | 12% | 10% | 9% | 8% |
| 3.59 | 3.54 | 91% | 46% | 30% | 23% | 18% | 15% | 13% | 11% | 10% | 9% |
| 3.92 | 3.87 | 100% | 50% | 33% | 25% | 20% | 17% | 14% | 13% | 11% | 10% |

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A communications cable comprising:
a plurality of twisted wire pairs each comprising a first wire twisted together with a second wire at a substantially uniform twist rate along the cable; and
an elongated shielding separator positioned between the twisted wire pairs and physically separating the twisted wire pairs from one another, the shielding separator comprising a plurality of discrete conductive regions electrically isolated from one another by non-uniform distances such that the discrete conductive regions are substantially aperiodic with the twist rates of the twisted wire pairs.

2. A shielding separator for use with a communications cable having a plurality of twisted wire pairs, the shielding separator comprising:
   a plurality of discontinuous separator sections arranged end-to-end in a series and configured to separate the twisted wire pairs of the communications cable from one another, each of the separator sections being electrically conductive along at least a portion of its outer surface, and having a length selected from a predetermined number of different section lengths, the shielding separator having more than one separator section of each of the different section lengths, each of the separator sections being positioned within the series to be aperiodic with others of the separator sections having a same length.

3. The shielding separator of claim 2, wherein each of the separator sections comprise a plurality of outwardly projecting dividers configured to extend outwardly between adjacent twisted wire pairs of the communications cable, each of the dividers has a distal end portion configured to be spaced outwardly from the adjacent twisted wire pairs divided by the divider, and the shielding separator further comprises:
   a conductive outer sheath segment corresponding to each of the separator sections, the corresponding separator section being positioned inside the outer sheath segment, and each of the outer sheath segments being coupled to the distal end portions of the dividers of the corresponding separator section.

4. The shielding separator of claim 3, wherein each of the outer sheath segments is aligned with its corresponding separator section and has a segment length approximately equal to the length of the corresponding separator section.

5. The shielding separator of claim 3, wherein adjacent outer sheath segments are separated from one another by a non-uniform distance.

6. The shielding separator of claim 3, wherein adjacent outer sheath segments are separated from one another by an air gap or a non-conductive material.

7. The shielding separator of claim 2, wherein adjacent separator sections are separated from one another by a non-uniform distance.

8. The shielding separator of claim 2, wherein adjacent separator sections are separated from one another by an air gap or a non-conductive material.

9. The shielding separator of claim 2, wherein the separator sections are positioned within the series in an arrangement that does not have a portion that repeats within a predetermined distance.

10. The shielding separator of claim 9, wherein the predetermined distance is between about 4 inches and about 20 feet.

11. The shielding separator of claim 2 for use with a communications cable configured to be operated at a plurality of operating frequencies, wherein each of the different section lengths is short enough to limit interference with the plurality of operating frequencies of the communication cable.

12. The shielding separator of claim 2 for use with a communications cable having a cable length, wherein the separator sections are positioned within the series in an arrangement having a repeating portion that repeats over the cable length of the communication cable, the repeating portion having a length that is long enough to limit induction of a significant amount of signal in the plurality of twisted wire pairs of the communication cable.

13. The shielding separator of claim 12, wherein the repeating portion has a length of about 10 centimeters to about 100 meters.

14. The shielding separator of claim 2, wherein each of the different section lengths is selected to limit induction of a significant amount of signal in the plurality of twisted wire pairs of the communication cable.

15. The shielding separator of claim 2, wherein the predetermined number of different section lengths is at least five.

16. A communications cable comprising:
   a plurality of twisted wire pairs each comprising a first wire twisted together with a second wire at a substantially uniform twist rate along the cable;
   an elongated shielding separator positioned between the twisted wire pairs and physically separating them from one another, the shielding separator comprising a plurality of electrically non-conductive separator sections positioned between the twisted wire pairs and a plurality of electrically conductive separator sections positioned between the twisted wire pairs and arranged in an alternating pattern with the non-conductive separator sections along the shielding separator, each of the conductive separator sections having one of a predetermined number of section lengths and being arranged along the shielding separator such that the conductive separator sections are substantially aperiodic with the twist rates of the twisted wire pairs; and
   an outer cable shielding system enclosing the shielding separator and the plurality of twisted wire pairs.

17. The communications cable of claim 16, wherein the communications cable is configured to be operated at a plurality of operating frequencies, and each of the predetermined number of section lengths is short enough to limit interference with the plurality of operating frequencies of the communication cable.

18. The communications cable of claim 16, wherein the communications cable has a cable length, and the conductive separator sections are arranged along the shielding separator in an arrangement having a repeating portion that repeats over the cable length of the communication cable, the repeating portion having a length that is long enough to limit induction of a significant amount of signal in the plurality of twisted wire pairs of the communication cable.

19. The shielding separator of claim 16, wherein each of the predetermined number of section lengths is selected to limit induction of a significant amount of signal in the plurality of twisted wire pairs of the communication cable.

20. The communications cable of claim 16, further comprising a cable length, the conductive separator sections being substantially aperiodic with the twist rates of the twisted wire pairs along at least one quarter of the cable length.

21. The communications cable of claim 16, wherein the outer cable shielding system comprises a plurality of conductive outer sheath segments,
   each of the conductive outer sheath segments has one of a predetermined number of segment lengths and is arranged along the twisted wire pairs such that the conductive outer sheath segments are substantially aperiodic with the twist rates of the twisted wire pairs, and
   the communications cable further comprises an insulation layer separating the conductive separator sections of the shielding separator from the conductive outer sheath segments of the outer cable shielding system.

22. The communications cable of claim 16, wherein the outer cable shielding system comprises a plurality of conductive outer sheath segments, and the communications cable further comprises an insulation layer separating the conductive separator sections of the shielding separator from the conductive outer sheath segments of the outer cable shielding system.

23. The communications cable of claim 16, wherein the outer cable shielding system comprises a conductive outer sheath segment corresponding to each of the separator sections, the conductive outer sheath segment being aligned with the corresponding separator section and coupled thereto with a portion of each of the twisted wire pairs being positioned between the conductive outer sheath segment and the corresponding separator section.

24. The communications cable of claim 16, wherein the shielding separator and the twisted wire pairs are twisted together in a bundle having a substantially uniform twist rate along the cable, and the predetermined section lengths and the arrangement of the conductive separator sections along the shielding separator are further configured to be substantially aperiodic with the twist rate of the bundle.

25. A communications cable comprising:
a plurality of twisted wire pairs each comprising a first wire twisted together with a second wire at a substantially uniform twist rate along the cable;
an elongated electrically non-conductive shielding separator positioned between the twisted wire pairs and physically separating them from one another, the non-conductive shielding separator being twisted together with the twisted wire pairs to form a bundle having a twist rate, the shielding separator comprising a discontinuous conductive outer layer, the discontinuous conductive outer layer being arranged in conductive regions along the non-conductive shielding separator such that the conductive regions are substantially aperiodic with the twist rates of the twisted wire pairs and the twist rate of the bundle; and
an outer cable shielding system enclosing the discontinuous shielding separator and the plurality of twisted wire pairs.

26. The communications cable of claim 25, wherein the discontinuous conductive outer layer applied to the non-conductive shielding separator is in a lee side spray shadowing distribution of conductive material.

27. The communications cable of claim 25, wherein the conductive regions of the discontinuous conductive outer layer comprise conductive foil.

28. A method comprising:
determining a period for at least a portion of a plurality of periodic structures in a communication cable operable at one or more operating frequencies;
for a plurality of candidate periods, determine a score representing a measure of aperiodicity of the candidate periods with respect to the portion of the periodic structures in the communication cable, each of the candidate periods comprising a first length and a second length;
select a plurality of the candidate periods having scores indicative of a sufficient amount of aperiodicity with the portion of the plurality of periodic structures in the communication cable;
for each selected candidate period, determine whether the candidate period will interfere with the one or more operating frequencies of the communication cable;
select non-interfering candidate periods from the selected candidate periods, the non-interfering candidate periods being those determined not to interfere with the one or more operating frequencies;
constructing a plurality of conductive separator sections, each conductive separator section (a) having a conductive section length approximately equal to the first length portion of a selected one of the non-interfering candidate periods, and (b) being associated with a separating distance equal to the second length portion of the selected one of the non-interfering candidate periods; and
arranging the conductive separator sections end-to-end in a series, adjacent conductive separator sections in the series being separated longitudinally from one another by a non-conductive portion having a non-conductive length approximately equal to the separating distance associated with one of the adjacent conductive separator sections, the arrangement spacing conductive separator sections having a same conductive section length at non-uniform distances from one another such that the positioning of the conductive separator sections is substantially aperiodic with respect to the portion of the plurality of periodic structures in the communication cable.

29. The method of claim 28, further comprising:
determining a minimum candidate period, each of the plurality of candidate periods being greater than the minimum candidate period.

30. The method of claim 28, further comprising before constructing the plurality of conductive separator sections:
determining whether any of the non-interfering candidate periods have a resonance frequency or a harmonic frequency that is the same as a resonance frequency or a harmonic frequency of another of the non-interfering candidate periods; and
excluding from the non-interfering candidate periods at least one of the non-interfering candidate periods having a resonance frequency or a harmonic frequency that is determined to be the same as a resonance frequency or a harmonic frequency of another of the non-interfering candidate periods.

31. A cable assembly comprising:
an elongated cable comprising:
(a) a plurality of twisted wire pairs each comprising a first wire twisted together with a second wire at a substantially uniform twist rate along the cable; and
(b) an elongated shielding separator positioned between the twisted wire pairs and physically separating them from one another, the shielding separator comprising a plurality of discrete conductive regions electrically isolated from one another by non-uniform distances such that the discrete conductive regions are substantially aperiodic with the twist rates of the twisted wire pairs; and
communication connector comprising:
(a) a different coupling portion connected to each of the first and second wires of each of the twisted wire pairs; and
(b) an engagement assembly configured to engage the elongated shielding separator.

32. The cable assembly of claim 31, wherein the engagement assembly comprises a plurality of positioning members configured to receive the elongated shielding separator therebetween.

* * * * *